US012450603B2

(12) United States Patent
Seidemann et al.

(10) Patent No.: US 12,450,603 B2
(45) Date of Patent: Oct. 21, 2025

(54) METHOD FOR BUILDING A BLOCKCHAIN

(71) Applicant: BASF SE, Ludwigshafen am Rhein (DE)

(72) Inventors: Lothar Seidemann, Ludwigshafen am Rhein (DE); Holger Kai Peter Jelich, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 385 days.

(21) Appl. No.: 18/012,997

(22) PCT Filed: Jun. 29, 2021

(86) PCT No.: PCT/EP2021/067875
§ 371 (c)(1),
(2) Date: Dec. 27, 2022

(87) PCT Pub. No.: WO2022/002956
PCT Pub. Date: Jan. 6, 2022

(65) Prior Publication Data
US 2023/0237479 A1    Jul. 27, 2023

(30) Foreign Application Priority Data

Jun. 30, 2020 (EP) .................................... 20183177
Mar. 16, 2021 (EP) .................................... 21162854

(51) Int. Cl.
*G06Q 20/40* (2012.01)
*H04N 1/32* (2006.01)
(Continued)

(52) U.S. Cl.
CPC ....... *G06Q 20/401* (2013.01); *H04N 1/32261* (2013.01); *H04N 1/32283* (2013.01);
(Continued)

(58) Field of Classification Search
USPC .......................................................... 358/1.9
See application file for complete search history.

(56) References Cited

U.S. PATENT DOCUMENTS

| 5,283,671 A | 2/1994 | Stewart et al. |
| 10,594,689 B1 | 3/2020 | Weaver et al. |

(Continued)

FOREIGN PATENT DOCUMENTS

| JP | 2001-117995 A | 4/2001 |
| JP | 2008078820 A * | 4/2008 |

(Continued)

OTHER PUBLICATIONS

"Kapitel 7 Kryptographisch sichere Hashverfahren" Retrived from hilbert.math.uni-mannheim.de/~seiler/Krypto10/Kryptologie10. pdf, pp. 273-292.

(Continued)

*Primary Examiner* — Jacky X Zheng
(74) *Attorney, Agent, or Firm* — Faegre Drinker Biddle & Reath LLP

(57) ABSTRACT

Computer implemented method for generating a hash value (110) is disclosed, the method comprises the following steps: i) Providing a first digital RGB image (112) having first RGB colors of a physical object (114); ii) Combining first transaction data (116) and the first digital RGB image (112), thereby generating a second RGB image (118) having second RGB colors; iii) Converting (128) color values of the second RGB image (118) from RGB color space (130) to a secondary color space (132) having at least four primary colors and determining (134) a number of respectively colored pixels for each primary color of the secondary color space (132); iv) Generating (136) the hash value (110) by converting the determined number of respectively colored (Continued)

Figure 1A:
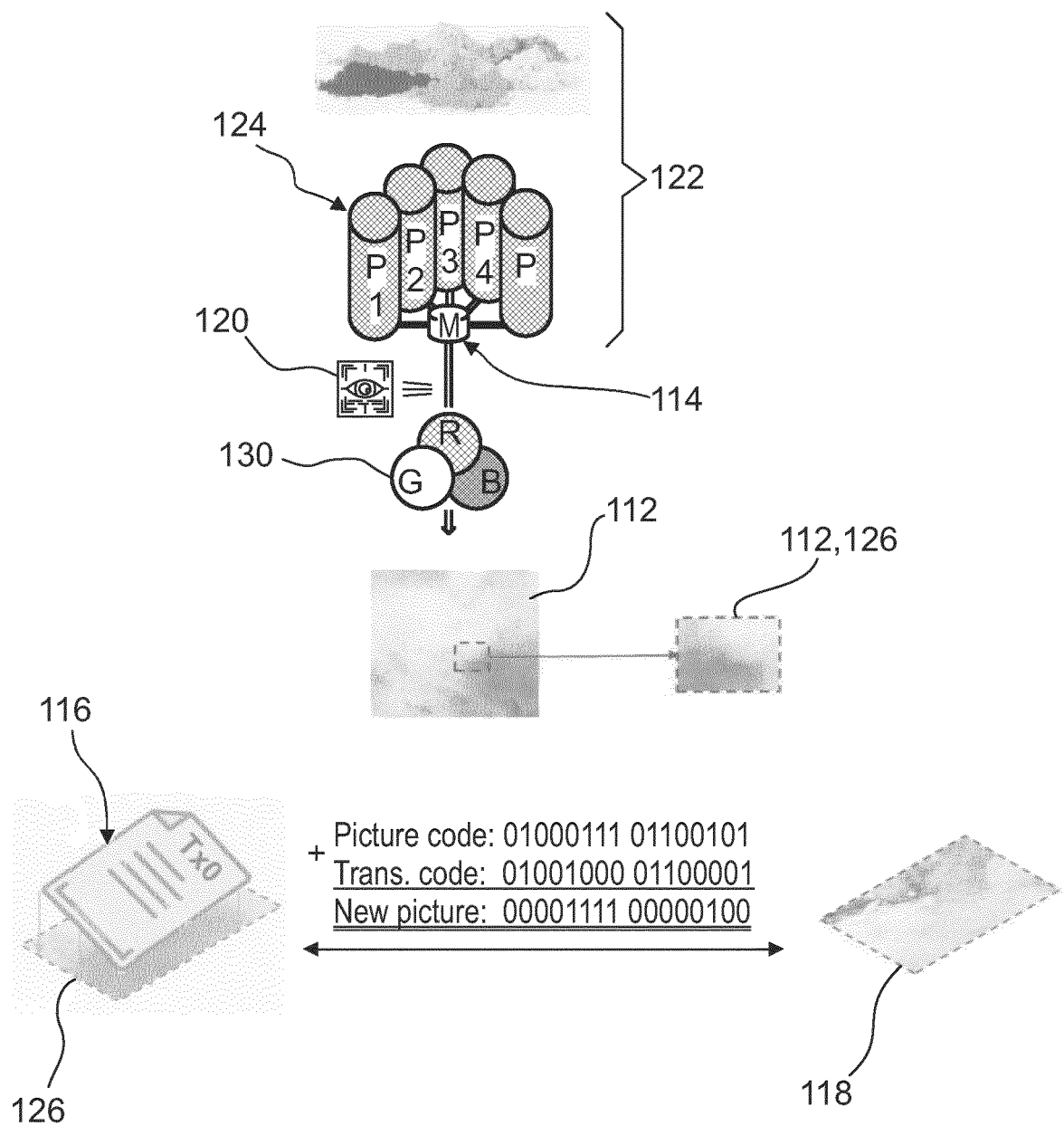

pixels for each primary color of the secondary color space (132) to hexadecimal numerals.

13 Claims, 7 Drawing Sheets

(51) Int. Cl.
    *H04N 1/393*     (2006.01)
    *H04N 1/60*     (2006.01)
    *H04L 9/00*     (2022.01)

(52) U.S. Cl.
    CPC ......... *H04N 1/32309* (2013.01); *H04N 1/393* (2013.01); *H04N 1/6016* (2013.01); *G06T 2207/10024* (2013.01); *H04L 9/50* (2022.05); *H04N 2201/3233* (2013.01)

(56) References Cited

U.S. PATENT DOCUMENTS

| | | | |
|---|---|---|---|
| 2004/0153649 A1* | 8/2004 | Rhoads | G07D 7/0034 707/E17.112 |
| 2015/0006390 A1 | 1/2015 | Aissi et al. | |
| 2019/0236406 A1* | 8/2019 | Blatt | G06V 10/44 |
| 2019/0385269 A1* | 12/2019 | Zachary | H04N 7/18 |

FOREIGN PATENT DOCUMENTS

| | | |
|---|---|---|
| JP | 2009-139722 A | 6/2009 |
| JP | 2017-162338 A | 9/2017 |
| WO | 2019/211178 A1 | 11/2019 |

OTHER PUBLICATIONS

"Merkle tree," Rretrieved from en.wikipedia.org/wiki/Merkle_tree, pp. 5.

Improving Image Performance by Using Color Lookup Tables, Adobe developer support, Technical Note #5121, Mar. 31, 1992 or https://www.rgbtohex.net/hextorgb/.

"Schule der Farben—Grundzüge der Farbentheorie für Computeranwender und andere", Küppers, Harald, DuMont Buchverlag, Köln 2. Edition, ISBN 978-3-7701-2841-9, pp. 125-134, or www.farbtabelle.at/farben-umrechnen.

Brilliant Math & Science Wiki, "Secure Hash Algorithms," Retrieved from https://brilliant.org/wiki/secure-hashing-algorithms/ , pp. 6.

Ghosh et al., "A Study on the Issue of Blockchain's Energy Consumption," Proceedings of International Ethical Hacking Conference, Jan. 2020, pp. 63-75.

Hashed Out by The SSL Store, "What Is a Hash Function in Cryptography? A Beginner's Guide," Retrieved from https://www.thesslstore.com/blog/what-is-a-hash-function-in-cryptography-a-beginners-guide/ , pp. 16.

Reyes-Garcia, E., "The Image-Interface: Graphical Supports for Visual Information," John Wiley & Sons, Oct. 2017, pp. 74.

Sedlmeir et al., "The Energy Consumption of Blockchain Technology: Beyond Myth," Business & Information Systems Engineering, vol. 62, No. 1, Jun. 19, 2020, pp. 599-608.

International Search Report and Written Opinion received for PCT Patent Application No. PCT/EP2021/067875, mailed on Jan. 5, 2022, 15 pages.

\* cited by examiner

146

112,
148,
150,
152

150,
156

150,
156

150,
156

METHOD FOR BUILDING A BLOCKCHAIN

CROSS-REFERENCE TO RELATED APPLICATIONS

This application is a National stage application (under 35 U.S.C. § 371) of PCT/EP2021/067875, filed Jun. 29, 2021, which claims benefit of European Application Nos. 20183177.3, filed Jun. 30, 2020, and 21162854.0, filed Mar. 16, 2021, all of which are incorporated herein by reference in their entirety.

TECHNICAL FIELD

The invention relates to a computer implemented method for generating a hash value, a computer implemented method for generating a root-hash, a computer implemented method for generating a nonce, a computer implemented method for generating a blockchain, a blockchain, crypto currency, and several uses of a blockchain. The methods, devices and systems according to the present invention specifically may be used for secured processing of transactions in the fields of smart contracts, financial services, healthcare, personal identification, cryptocurrencies, supply chain. Other applications are possible.

BACKGROUND ART

In many applications, such as in the fields of financial services, healthcare, personal identification, cryptocurrencies, supply chain and others, the blockchain technology is an efficient technology to ensure the secured processing of transactions such as of licensing, cooperation with other companies and selling technology.

A blockchain is a growing list of records, called blocks, that are linked using cryptography. Each block contains a cryptographic hash of the previous block, a timestamp, and transaction data. By design, a blockchain is resistant to modification of the data. It is "an open, distributed ledger that can record transactions between two parties efficiently and in a verifiable and permanent way", see en.wikipedia.org/wiki/Blockchain. For use as a distributed ledger, a blockchain is typically managed by a peer-to-peer network collectively adhering to a protocol for inter-node communication and validating new blocks. Each block includes the cryptographic hash of the prior block in the blockchain, linking the two. The linked blocks form a chain. This iterative process confirms the integrity of the previous block, all the way back to the original genesis block. The blockchain technology typically requires a cryptographic hash function, multiple information needs to be processed and a Hash function to map data of arbitrary size to fixed-size values such that the data in any given block cannot be altered retroactively.

US 2004/153649 A1 describes systems for creating and authenticating printed objects using authentication information. Techniques for incorporating authentication information into digital representations of objects and using the authentication information to authenticate the objects are also described.

JP 2008 078820 A describes an image processing apparatus for converting first image data to be expressed with a plurality of element colors into second image data to be expressed with a plurality of other element colors includes: a means for generating a hash value, based on the distribution ratio of the plurality of element colors to be determined based on the characteristic of the color for color conversion and a human visual sense characteristic on the basis of the input first image data; a color conversion table for indicating correspondence relationship between the first image data and the second image data in accordance with the hash value; and a means for applying color conversion to the second image data corresponding to the generated hash value, based on the color conversion table. When the generated hash value is not present in the color conversion table, the hash value and the correspondence relationship between the first image data and the second image data are added to the color conversion table.

Despite the achievements of known blockchain technology and methods for generating blockchains, in particular in view of recent progress in computer technology, increasing availability of computer power and resources, there is still a need for increasing data security and manipulation security. Specially, non-traceability of generating of hash values needs to be ensured.

For this purpose, a cryptographic hash function is required, which provides three fundamental safety characteristics to keep data secured: pre-image resistance, second pre-image resistance, and collision resistance. The provision of pre-image resistance makes it hard and time-consuming for an attacker to find an original message given the respective hash value. This security is provided by the nature of one-way functions, which is a key to ward off brute force attacks from powerful computers. The second safety characteristic is called second pre-image resistance, granted when a message is known, yet it is hard to find another message, that delivers the same hash value. The last safety characteristic is collision resistance, which makes it extremely difficult to find two inputs that hash to the same hash value. For further details, reference is made to brilliant.org/wiki/secure-hashing-algorithms.

Moreover, the cryptographic hash function is proposed to allow providing properties of a strong hash algorithm: determinism, pre-image resistance, collision resistance, avalanche effect. As described in www.thesslstore.com/blog/what-is-a-hash-function-in-cryptography-a-beginnersguide/, a hash algorithm should be deterministic, meaning that it always gives you an output of identical size regardless of the size of the input you started with. This means that if you are hashing a single sentence, the resulting output should be the same size as one you would get when hashing an entire book. A strong hash algorithm is one that is preimage resistance, meaning that it's infeasible to reverse a hash value to recover the original input plaintext message. Hence, the concept of hashes being irreversible, one-way functions. A collision occurs when two objects collide. If two unique samples of input data result in identical outputs, it is known as a collision. This means that the used algorithm to hash the data is broken and, therefore, insecure. Basically, the concern here is that someone could create a malicious file with an artificial hash value that matches a genuine (safe) file and pass it off as the real thing because the signature would match. So, a good and trustworthy hashing algorithm is one that is resistant to these collisions. The avalanche effect refers to that any change made to an input, no matter how small, will result in a massive change in the output. Essentially, a small change snowballs into something much larger, hence the term "avalanche effect."

Moreover, with respect to hash security reference is made to hilbert.math.unimannheim.de/~seiler/Krypto10/Kryptologie10.pdf, pages 273-292.

Problem to be Solved

It is therefore desirable to provide methods and devices, which address the above-mentioned technical challenges. Specifically, a computer implemented method for generating a hash value, a computer implemented method for generating a root-hash, a computer implemented method for generating a nonce, a computer implemented method for generating a blockchain, a blockchain, crypto currency, and several uses of a blockchain shall be provided, which allow for increased data security and manipulation security of data, in particular of transaction data.

SUMMARY

This problem is addressed by a computer implemented method for generating a hash value, a computer implemented method for generating a root-hash, a computer implemented method for generating a nonce, a computer implemented method for generating a blockchain, a blockchain, crypto currency, and several uses of a blockchain, with the features of the independent claims. Advantageous embodiments which might be realized in an isolated fashion or in any arbitrary combinations are listed in the dependent claims.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the present invention, a computer implemented method for generating a hash value is proposed. The method comprises the following method steps which, specifically, may be performed in the given order. Still, a different order is also possible. It is further possible to perform two or more of the method steps fully or partially simultaneously. Further, one or more or even all of the method steps may be performed once or may be performed repeatedly, such as repeated once or several times. Further, the method may comprise additional method steps which are not listed.

The term "computer-implemented" as used herein is a broad term and is to be given its ordinary and customary meaning to a person of ordinary skill in the art and is not to be limited to a special or customized meaning. The term specifically may refer, without limitation, to a process which is fully or partially implemented by using a data processing means, such as data processing means comprising at least one processor. The term "computer", thus, may generally refer to a device or to a combination or network of devices having at least one data processing means such as at least one processor. The computer, additionally, may comprise one or more further components, such as at least one of a data storage device, an electronic interface or a human-machine interface.

Generally, a hash value may be generated using a hash function. A hash functions may be an arbitrary function that can be used to map data of arbitrary size to fixed-size values. The values returned by a hash function are called hash values. The term "hash value" as used herein is a broad term and is to be given its ordinary and customary meaning to a person of ordinary skill in the art and is not to be limited to a special or customized meaning. The term specifically may refer, without limitation, to a numeric value of a fixed length which uniquely representing data.

The term "data" as used herein is a broad term and is to be given its ordinary and customary meaning to a person of ordinary skill in the art and is not to be limited to a special or customized meaning. The term specifically may refer, without limitation, to information and/or to machine-readable signals or symbols representative for information. The data specifically may be or may comprise one or both of digital data and analogue data.

The method comprises the following steps:
i) Providing a first digital RGB image having first RGB colors of a physical object;
ii) Combining first transaction data and the first digital RGB image, thereby generating a second RGB image having second RGB colors;
iii) Converting color values of the second RGB image from RGB color space to a secondary color space having at least four primary colors and determining a number of respectively colored pixels for each primary color of the secondary color space;
iv) Generating the hash value by converting the determined number of respectively colored pixels for each primary color of the secondary color space to hexadecimal numerals.

The term "digital image", also denoted digital picture, as used herein is a broad term and is to be given its ordinary and customary meaning to a person of ordinary skill in the art and is not to be limited to a special or customized meaning. The term specifically may refer, without limitation, to a two-dimensional representation of the physical object. The terms image and picture are used in the following as synonyms. The terms "first" and "second" and the like are used as names only. The term "digital RGB image" as used herein is a broad term and is to be given its ordinary and customary meaning to a person of ordinary skill in the art and is not to be limited to a special or customized meaning.

The term specifically may refer, without limitation, to a color digital image having three color channels, i.e. one for red (R), one for green (G) and one blue (B). The primary colors of the digital RGB image may be red, green and blue. The RGB digital image may have a color channel for each primary color. The digital color image may comprise a plurality of image pixels, wherein each image pixel is made of combinations of the primary colors. For example, the digital RGB image may be 24-bit or 48-bit. Each pixel of the digital RGB image may be specified by two spatial coordinates and three color values.

The term "providing" the first digital RGB image, as used herein is a broad term and is to be given its ordinary and customary meaning to a person of ordinary skill in the art and is not to be limited to a special or customized meaning. The term specifically may refer, without limitation, to generating the first digital RGB image or retrieving the first digital RGB image of the physical object from a database such as from physical objects like paintings, buildings, plants and the like.

Preferably, the first digital RGB image may be generated by digital scanning of the physical object. The physical object may be an arbitrary physical object. For example, the physical object may be a blend, a painting, a building, a plant and the like.

Specifically, the providing of the first digital RGB image may comprise blending and/or mixing pigments and scanning the blended and/or mixed pigments. The method may comprise blending at least two materials according to at least one item of blending information by using a blending device, thereby generating at least one blend.

The term "material" as used herein is a broad term and is to be given its ordinary and customary meaning to a person of ordinary skill in the art and is not to be limited to a special or customized meaning. The term specifically may refer, without limitation, to a chemical element or a chemical compound, specifically a chemical element or a chemical compound being capable of mixing with other chemical elements or chemical compounds. The material specifically may be suitable for pouring. The material generally may be in one or more of a solid state, specifically a granular solid state, a liquid state or a gaseous state. Specifically, the material may be or may comprise at least one of a powder or a liquid. The material may be a homogeneous, unitary material. Alternatively, the material may also comprise a plurality of components which are mixed homogeneously or inhomogeneously. Thus, the material may be a mixture or a composite by itself. As an example, the material may be or may comprise a liquid, wherein the liquid, as an example, comprise at least one solvent and at least one chemical compound dissolved, emulsified or dispersed in the at least one solvent. The solvent may form part of the material, or, alternatively, the at least one chemical compound may be considered the material, whereas the solvent may simply be considered as an adjuvant or additive to the material.

The term "blending" as used herein is a broad term and is to be given its ordinary and customary meaning to a person of ordinary skill in the art and is not to be limited to a special or customized meaning. The term specifically may refer, without limitation, to the process of mixing the at least two materials in a defined manner, thereby creating a blend. The process of creating the blend may include further steps such as temperature changes or temperature treatments of the at least two materials The mixing take place in various ways, in accordance with the nature of the at least two materials. As an example, in case the at least two materials comprise powders, the mixing may involve co-dispensing or subsequently dispensing the powders into a common receptacle, including the option of stirring the mixture. Additionally or alternatively, in case the at least two materials comprise liquids, the mixing may also involve co-dispensing or subsequently dispensing the liquids into a common receptacle, including the option of stirring the mixture. Additionally or alternatively, as will be outlined in further detail below, the mixing may also comprise printing processes, e.g. inkjet printing of the at least two materials, e.g. onto a common substrate. Additionally or alternatively, the blending may comprise other types of mixing processes of the at least two materials, such as mixing the at least two materials on at least one common substrate. As an example, the blending may comprise one or more electrostatic precipitation processes, such as electrostatic precipitation of the at least two materials, e.g. onto a common substrate, e.g. onto an electrostatic charged surface. Thus, specifically, the blending and/or mixing may comprise electrostatic precipitation in printing processes. For example, the blending and/or mixing may comprise electrostatic precipitation in printing processes of at least two electrostatic charged materials onto an electrostatic neutralized surface. Thus, the materials may be mixed, thereby at least temporarily changing their electrical charges. Specifically, the blending and/or mixing may comprise electrostatic precipitation in laser printing processes, such as processes typically performed in a laser printer. In particular, the at least two materials, e.g. the pigments, may for example firstly be electrostatically charged and deposited on an equally charged image roll where specific areas have been electrostatically neutralized, e.g. by using a laser and/or LED. These deposited materials may, as an example, then be drawn and/or removed off the image roll by a reversely charged substrate, such as by a reversely charged paper.

The blending may leave the materials unchanged or may also fully or partially change the nature of the materials. Thus, as an example, the materials may simply be mixed without any chemical changes. Additionally or alternatively, the materials may be mixed, thereby changing their chemical nature. The latter specifically may take place in case the materials contain solvents which, during the blending or afterwards, may fully or partially evaporate. Again, additionally or alternatively, the materials may also fully or partially react with each other, thereby generating at least one reaction product.

The term "blend" as used herein is a broad term and is to be given its ordinary and customary meaning to a person of ordinary skill in the art and is not to be limited to a special or customized meaning. The term specifically may refer, without limitation, to a mixture of the at least two materials. The mixture specifically may be present in at least one receptacle and/or on at least one substrate. The mixture generally may be in one or more of a solid state, specifically a granular solid state, a liquid state or a gaseous state. Specifically, the mixture may be or may comprise at least one of a powder or a liquid. The mixture may be in the same state as the materials or may be in a different state. As an example, at least one of the materials may be in a liquid state, wherein the mixture may also be in a solid state, which may be the case e.g. after a drying process. Thus, as an example, the at least two materials may be mixed in the blending process in a liquid state, wherein, afterwards, a drying may take place, thereby evaporating at least one solvent and/or thereby changing the chemical nature of the mixed materials. As an example, the mixing process may imply a printing of the at least two materials in a liquid state onto at least one substrate, followed by a drying or setting process, wherein the blend, consequently, may be in a dried or solid state. Other examples may imply a phase change process, such as a curing or a solidifying of the materials after mixture.

The term "item of blending information" as used herein is a broad term and is to be given its ordinary and customary meaning to a person of ordinary skill in the art and is not to be limited to a special or customized meaning. The term specifically may refer, without limitation, to at least one item of information describing a defined blending process. The at least one item of blending information may refer to the process of blending itself, such as to the way the at least two materials are mixed, e.g. to process parameters of the mixing process. Additionally or alternatively, the at least one item of blending information may also refer to the materials for blending, such as to quantities to be mixed in the blending process, e.g. to masses or volumes of the materials.

The term "blending device" as used herein is a broad term and is to be given its ordinary and customary meaning to a person of ordinary skill in the art and is not to be limited to a special or customized meaning. The term specifically may refer, without limitation, to a device which is configured for performing the above described blending process. Specifically, as will also be outlined in further detail below, the blending device may comprise at least one of a feed or a reservoir for each of the materials. The blending device may also comprise at least one blending element, such as at least one of a nozzle, a stirring device, a printer, a mixer or the like.

Consequently, the term "blend" as used herein is also a broad term and is to be given its ordinary and customary meaning to a person of ordinary skill in the art and is not to be limited to a special or customized meaning. The term specifically may refer, without limitation, to a mixture of at least two materials. The blend specifically may be present on a substrate or in a receptacle. The blend specifically may comprise a finite amount of the materials.

The providing of the first digital RGB image may comprise detecting at least one material property of the blend by using at least one detector. The term "material property" as used herein is a broad term and is to be given its ordinary and customary meaning to a person of ordinary skill in the art and is not to be limited to a special or customized meaning. The term specifically may refer, without limitation, to an arbitrary property of a material, such as of the blend. The property specifically may refer to one or more of a physical, a chemical or a biological property. Specifically, the material property may comprise at least one of a mechanical property or an optical property of the material. The material property specifically may refer to a measurable property of the respective material. More specifically, the at least one material property may be or may comprise at least one color of the blend. Additionally or alternatively the at least one property selected from the group consisting of: a specific density of the blend; a volume of the blend; a weight of the blend; an optical property of the blend; a spectral composition of the blend, specifically a color spectrum of the blend; a color intensity of the blend; a viscosity of the blend. Other material properties may be used alternatively or additionally.

The step of detecting the at least one material property of the blend specifically may comprise generating at least one item of measurement information on the material property. Thus, the at least one item of measurement information may generally refer to the result of a measurement of the at least one material property, such as to at least one numerical measurement value indicating the at least one material property of the blend or being characteristic for the at least one material property of the blend. Thus, as an example, the at least one item of measurement information may, as an example, comprise at least one of the following items of information: a specific density measurement value of the blend; a volume measurement value of the blend; a weight measurement value of the blend; an optical property measurement value of the blend; a color measurement value of the blend; a spectral composition measurement value of the blend, specifically a color spectrum measurement value of the blend; a color intensity measurement value of the blend; a viscosity measurement value of the blend. These measurement values might as an example each may be or may comprise a single number or a plurality of numbers, such as distributions, spectra or the like. Specifically, the at least one item of measurement information may be or may comprise at least one numerical value such as a digital value.

The term "detecting" as used herein is a broad term and is to be given its ordinary and customary meaning to a person of ordinary skill in the art and is not to be limited to a special or customized meaning. The term specifically may refer, without limitation, to the process of generating information on a property or measurable variable, wherein qualitative and/or quantitative information may be retrieved. The term specifically may refer to the process of measuring at least one measurable variable of the physical object. Consequently, the term "detector" as used herein is a broad term and is to be given its ordinary and customary meaning to a person of ordinary skill in the art and is not to be limited to a special or customized meaning. The term specifically may refer, without limitation, to an arbitrary device configured for performing the detecting process, such as a device having at least one sensor for measuring the at least one measurable variable of the object. As an example, the sensor may comprise one or more of: a weight sensor, specifically a scale; a volume sensor; a density sensor; a color sensor; a particle size distribution sensor. Other sensors may be used in addition or alternatively.

The at least one item of blending information specifically may comprise n blending variables, wherein n denotes a positive integer. The term "blending variable" as used herein is a broad term and is to be given its ordinary and customary meaning to a person of ordinary skill in the art and is not to be limited to a special or customized meaning. The term specifically may refer, without limitation, to a variable which either quantitatively or qualitatively describes at least one aspect or parameter of the blending. As an example, the blending variable may refer to the at least two materials, to detect of the blending process such as quantities or material streams for mixture or the like. Further, m material properties of the blend may be detected, with m being a positive integer. Specifically, the number m of material properties detected may be as large or larger than the number n of blending variables. In other words, preferably, rrin. In still other words, specifically, the information generated by the detection may be at least as large as the information used for the generating of the blend, wherein the term "information" may refer to the numbers n and m, respectively, and/or may generally refer to the number of degrees of freedom and/or to the logarithm of the degrees of freedom, such as log n or log m, respectively.

The at least two materials blended specifically may be different materials, specifically materials being different with respect to at least one property selected from the group consisting of: a chemical property, specifically a chemical composition; an optical property, specifically an optical appearance such as one or more of a color, a transparency, a brilliance; a mechanical property, specifically one or more of granularity, particle size, density, viscosity or flowing properties; an electrostatic chargeability; a compressibility; a crystallinity; a particle shape. Still, additionally or alternatively, other properties may be used.

The at least two materials specifically may comprise bulk materials and/or loose materials. The at least two materials, independently, each may be selected from the group consisting of solid materials, gaseous materials and liquid materials. More specifically, the at least two materials, independently, may be selected from the group consisting of and/or may comprise at least two materials selected from the group consisting of:
- a powder, specifically a powder selected from the group consisting of:
  - an inorganic powder, specifically an inorganic powder made of a mineral;
  - an organic powder, specifically an organic powder made of a polymer;
  - a pigment;
- a liquid, specifically a liquid selected from the group consisting of a pure liquid, a suspension, an emulsion or a solution, more specifically one or more of a liquid color and an ink.

In the context of the present invention, any suitable pigment can be used. It is also possible to use mixtures of one or more pigments in the context of the present invention.

In the context of the present invention, the amount of the pigments used may vary. Preferably, the amount of pigments used is in the range of from $10^{-15}$ g/cm$^2$ to 1 g/cm$^2$, more preferable in the range of from $10^{-9}$ g/cm$^2$ to $10^{-3}$ g/cm$^2$.

The particle size of the pigments used preferably is in the range of from 10 nanometer to 1 mm, preferably, in particular in the range of from 100 nanometer to 100 micrometer.

Preferably, suitable pigments are selected from inorganic materials, preferably from metal oxides, metal oxides, preferably metal oxides from natural sources. Suitable may for example be pigments selected from iron oxides. Iron oxide pigments are relatively low-cost materials that resist color change due to exposure to sunlight, have good chemical resistance and are stable under normal ambient conditions. It has been found that iron oxides are particularly suitable since the materials can easily be recycled and reused. Iron oxide pigments can for example be collected and can be used as feedstock for steel production leading to the avoidance of disposal of used pigment as waste.

Suitable iron oxides are also available as natural pigments. Suitable red pigments may be derived from hematite, yellow and brown pigments, such as ochres, sierras and umbers, may be derived from limonite, and magnetite provides a black iron oxide pigment. Furthermore, synthetis pigments, in particular metal oxides such as iron oxides, which are manufactured under controlled conditions such that particle size, distribution and shape resulting in superior uniformity, may be used according to the present invention to improve color quality and chemical purity.

For example, pigments from natural sources are suitable for the method of the present invention such as pigments selected from natural organic materials, for example organic material from plants, animals, and minerals. Also suitable are pigments selected from synthetic organic materials such as for example azopigments. Suitable mineral pigments are for example ochre, sienna, azurite, cobalt or ultramarine. Also spinels may be used. Ochre is usually a red or yellow that is obtained from ore of iron or ferruginous clay. Sienna is a form of limonite clay that is derived from ferric oxides to produce a rich red. Azurite is found in the upper oxidized portions of copper ore deposits. Ultramarine can be obtained from lapis lazuli or can be artificially manufactured. Spinels are available in yellow, orange, turquoise, and blue. Further examples include: carmine lake natural red 4 (cochineal), natural yellow 3 lake (from plants), madder lake natural red 9 (madder root), indigo lake natural blue 2 (woad), chlorophylin green lake (plant matter), vegetable or bone black, titanium white, iron oxides, talc, chalk, kaolin and other earth pigments.

According to a further embodiment of the present invention, preferably at least 20%, more preferably 30%, and most preferably 40%, of the pigments used should be of natural origin, i.e. derived from natural products, other than products of the petrochemical industry, by simple separation or purification steps.

In the context of the present invention the term pigments also comprises pigments which are visible under UV light. Sustainable and eco friendly materials may be used such as pigments from Clariant available under the Ecotrain label, for example pigments selected from the group of Novoperm Yellow HR 72, Hostaperm Blue B2G 03, Hostaperm Green GNX 01, Hansa Brilliant Yellow 2GX 72-S, Hostaperm Yellow H3G EDW VP 5131, Novoperm Orange HL 71, and Hostaperm Blue B2G-EDS VP 3491.

In the context of the present invention, it is also possible to use effect pigments such as for example absorption pigments, metal effect pigments, and pearlescent pigments. Metal effect pigments or metallic effect pigments usually consist of flakes or platelets of aluminum, copper, copper-zinc alloys, zinc and other metals. Suitable pearlescent pigments are for example mica-based pigments, but also pigments based on silica or alumina flakes. Suitable are for example pigments of natural mica coated with thin films of metal oxides such as $TiO_2$ or iron oxide. Furthermore, pigments based on silica flakes ($SiO_2$) or alumina ($Al_2O_3$) based pigments can be used in the context of the invention. Suitable substrate-free pearlescent pigments are for example natural pearl essence, basic lead carbonate, bismuth oxychloride, micaceous iron oxide and $TiO_2$ flakes.

The present invention takes the advantage of using the high entropy of solid particle bulks when they are blended. So for a dense particle system of 1 μm of average particle size and of 1 mm$^3$ of volume containing trillion of particles, trillions of equations would be need to be solved to describe the position of these particles. Thus, as outlined above and as outlined in more detail below, the present invention provides a technology for ensuring increased data security and manipulation security of data of blockchain technology. The blockchain technology is one of the biggest innovative technology that has been developed and has potential usage in fields of education, business and industries. Since the creation of bitcoins, blockchain has emerged as a means for storing digital information without the intervention of any third parties. It is used for various other applications than just being a simple distributed ledger. With time it has imposed a larger impact on different fields of economy and has gained popularity for its immutability. But, there are some issues faced by blockchain technology.

One of such issues is the energy consumption. Blockchains are found to consume exorbitant amount of energy because of the algorithm followed for its creation. Johannes Sedlmeir et al., "The Energy Consumption of Blockchain Technology: Beyond Myth", Bus Inf Syst Eng 62(6):599-608 (2020), https://doi.org/10.1007/s12599-020-00656-x and Eshani Ghosh and Baisakhi Das, "A study on the issue of blockchain's energy consumption", January 2020, DOI: 10.1007/978-981-15-0361-0_5, Proceedings of International Ethical Hacking Conference 2019 (pp. 63-75), describe enormous energy consumption needed for blockchain technology. The present invention proposes an effective way to analyze the physical results due the optical principle, especially if applying colored pigments for performing the blending of solid particle bulks. Hence, applying the high entropy of solid particle bulks, may result in an enormous advantage to reduce the energy consumption for the blockchain technology in general. In particular the energy consumption can be enhanced if the pigments described above, such as "natural pigments", are used which do not require the energy input to perform the chemical synthesis. Using natural pigments in a printer may reduce the electrical energy consumption by 99% compared to publicly available data for the Bitcoin blockchain technology, see publications above. Thus, the present invention provides a significant contribution to reduce costs and $CO_2$ emission as most of the electrical energy is not from renewable sources.

The blending of the at least two materials may be performed according to at least one item of blending information. The at least one item of blending information specifically may comprise at least one of: quantities for the at least two materials to be blended; weights for the at least two materials to be blended; volumes of the at least two materials to be blended; a blending ratio of volumes of the at least two materials to be blended; a blending ratio of weights of the at least two materials to be blended; mixing instructions for mixing two or more continuous or discontinuous streams of the at least two materials to be blended; printing instructions for blending the at least two materials to be blended, such as a tilting information for blending the at least two materials to be blended using differently tilted raster images, e.g. raster images generated by a raster image processor (RIP) of a printer. Still, additionally or alternatively, other types of blending information may also be used.

The at least two materials may be fed into the blending device continuously or discontinuously. Thus, as an example, the blending device may comprise at least two reservoirs for the at least two materials to be blended. Additionally or alternatively, however, other means of feeding the materials into the at least one blending device are also possible. Thus, as an example, a continuous feeding is also possible, in addition or alternatively to using at least one reservoir for at least one of the materials.

The blending device may further comprise at least one receiving element for receiving the blend. As used herein, the term "receiving element" may generally refer to an arbitrary element configured for receiving the blend. The receiving element specifically may have at least one receiving surface and/or at least one receiving material for receiving the blend. Thus, as an example, the at least one receiving element specifically may comprise at least one element selected from the group consisting of: a receiving vessel for receiving the blend; a substrate for receiving the blend. The at least one receiving element may be a stationary receiving element and/or maybe a moving receiving element, such as a rotatable receiving element. As an example, the receiving element may comprise at least one substrate, such as a substrate having at least one substrate surface which may be or may comprise a planar substrate surface and/or which may be or may comprise a curved substrate surface. As an example, the receiving element may comprise at least one drum having a receiving surface for receiving the blend, such as a rotating drum. The blend, by using the blending device, specifically may be deposited directly or indirectly on to the rotating drum. As an example, a drum may be used on which the blend is temporarily secured, such as electrostatically. These electrostatic drums are generally known in the technical field of printing, such as laser printing.

In case the receiving element comprises at least one drum, the drum specifically may be a rotating drum. Therein, the method may further comprise at least one cleaning step in which, after detecting the at least one material property, the blend specifically may be removed from the receiving surface of the drum. As an example, powders and/or pigments may be dispensed onto a rotating drum and may be, as an example, temporarily secured to the surface of the rotating drum by electrostatic forces. During that time of securing the blend to the surface of the rotating drum, the at least one material property of the blend on the surface might be detected, e.g. by optical reading. As an example and as will be outlined in further detail below, colors may be detected and, subsequently, may, as an example, be transformed into binary information, such as a binary row of numbers. Subsequently, the drum may be cleaned, such as by rotating into a cleaning position, e.g. by rotating the drum by 90°.

A similar procedure, optionally without the securing by electrostatic forces, may also be performed by using inkjet printing, either directly onto the surface of a drum and/or onto a moving substrate, such as onto a paper substrate. The drum, after detecting the at least one property, may be cleaned for reuse. Thus, as an example, the blending device may comprise at least one inkjet printer. The materials may be or may comprise inkjet printing of the materials, which may be or may comprise liquid materials, onto the at least one receiving element, such as onto the at least one rotating drum and/or onto at least one substrate. Subsequently, the detection of the at least one material property may take place, such as of the at least one optical property, e.g. by optical reading. As an example, again, colors may be detected and, subsequently, may, as an example, be transformed into binary information, such as a binary row of numbers. Subsequently, the drum may be cleaned, such as by rotating into a cleaning position, e.g. by rotating the drum by 90°. Additionally or alternatively, besides cleaning the at least one receiving element, a new receiving element or a new part of the receiving element may be used for further steps, such as for further printing and for repeating the blending and the detecting.

The blending device specifically may comprise at least one blending element for generating the blend. The term "blending element" as used herein is a broad term and is to be given its ordinary and customary meaning to a person of ordinary skill in the art and is not to be limited to a special or customized meaning. The term specifically may refer, without limitation, to an arbitrary element, device or combination of elements configured for blending the at least two materials, specifically by mixing the at least two materials, e.g. before, during or after deposition onto the at least one optional receiving element. As an example, the at least one blending element may be or may comprise at least one element selected from the group consisting of: a dispenser for continuously or discontinuously dispensing at least one of the two materials; a printer for printing the at least two materials onto at least one receiving element, specifically onto at least one substrate, specifically at least one printer selected from the group consisting of: an inkjet printer, a laser printer. Still, additionally or alternatively, other types of blending elements may be used. Thus, as an example, the blending element may be or may comprise at least one of a stirring element, a dispenser, a nozzle, an extruder.

The blending device may be or may comprise at least one printer. The printer is configured for receiving the at least one item of blending information and for mixing the blend. The term "printer" as used herein is a broad term and is to be given its ordinary and customary meaning to a person of ordinary skill in the art and is not to be limited to a special or customized meaning. The term specifically may refer, without limitation, to a device configured for applying, e.g. printing, at least one material onto at least one printing surface or substrate, specifically in a patterned fashion, according to at least one printer control information. Thus, typically, the printer may be configured for generating text and/or images on the at least one printing surface according to the at least one printer control information, such as one or more of a string of characters, a bitmapped image, a vector image, a computer program, e.g. provided in at least one printer control language. In particular, the printer, specifically at least one function of the printer, may be controllable via at least one printer control language, such as one or more page description languages (PDLs), printer command languages (PCLs), PostScript, XML Paper Specification and the like.

In particular, the printer may comprise one or more of a drum, such as an image drum; a laser, a lens system, such as a lens system comprising at least one mirror, e.g. a rotatable mirror; a cleaning element, such as a roll, a scraper or similar means for cleaning, e.g. for cleaning the drum; a cassette, e.g. for storing one or more of the substrate, such as a paper cassette; at least one transporting element, such as a roller and/or conveyor, e.g. for feeding, transferring and/or ejecting the substrate, specifically the paper, into, within and/or from the printer; a printer control unit configured for controlling the printer.

The printer may specifically be configured for blending the at least two materials according to the at least one item of blending information onto at least one substrate. In particular, the printer may be configured for blending the at least two materials according to the item of blending information, thereby e.g. generating the blend, onto a substrate for receiving the blend. The substrate may specifically be or may comprise at least one carrier medium, such as a carrier medium selected from the group consisting of: a glass carrier, such as a glass plate or a glass sheet; a plastic carrier, such as a plastic plate or a plastic sheet; a paper carrier, such as a paper sheet; a canvas. Other substrates may be feasible. As an example, the substrate may be a part of the printer itself or may be embedded within the printer. In particular, the substrate comprised by the printer may be a reusable carrier medium, such as a medium having a cleanable surface, e.g. a drum of the printer, for example a rotating drum.

The printer may further be configured for blending the at least two materials such that at least one pattern, specifically at least one interference pattern, is generated. The at least two materials to be blended by the printer may in particular be different materials, specifically materials being different with respect to at least one property. As an example, the at least two materials to be blended by the printer may differ in at least one property selected from the group consisting of: a chemical property, specifically a chemical composition; an optical property, specifically an optical appearance such as one or more of a color, a transparency, a brilliance; a mechanical property, specifically one or more of granularity, particle size, density, viscosity or flowing properties; an electrostatic chargeability; a compressibility; a crystallinity; a particle shape.

The method may comprise transforming the detected material property into RGB values for generating the first digital RGB image. The transforming may be performed by using at least one data processing device configured for applying at least one transformation algorithm to the material property. The transforming of the at least one material property into RGB values may take place in a computer-implemented fashion. Thus, the transforming of the at least one material property into the RGB values takes place by using at least one data processing device configured for applying the at least one transformation algorithm to the material property. The term "data processing device" as used herein is a broad term and is to be given its ordinary and customary meaning to a person of ordinary skill in the art and is not to be limited to a special or customized meaning. The term specifically may refer, without limitation, to a computer or a computer system, having at least one processor and optionally having at least one data storage device. Therein, the processor, as an example, may comprise at least one integrated circuit configured for executing computer readable instructions. The processor, additionally or alternatively, may also be or may comprise at least one application-specific integrated circuit and/or at least one field-programmable gate array. The configuration of the data processing device for applying the at least one transformation algorithm, as an example, may be performed by providing a plurality of computer-readable instructions to the data processing device, e.g. via at least one data storage device and/or via at least one interface.

The term "processor" as used herein is a broad term and is to be given its ordinary and customary meaning to a person of ordinary skill in the art and is not to be limited to a special or customized meaning. The term specifically may refer, without limitation, to an arbitrary logic circuitry configured for performing basic operations of an electronic device or system, and/or, generally, to a device which is configured for performing calculations or logic operations. In particular, the processor may be configured for processing basic instructions that drive the device or system, such as a computer. As an example, the processor may comprise at least one arithmetic logic unit (ALU), at least one floating-point unit (FPU), such as a math coprocessor or a numeric coprocessor, a plurality of registers, specifically registers configured for supplying operands to the ALU and storing results of operations, and a memory, such as an L1 and L2 cache memory.

The term "algorithm" as used herein is a broad term and is to be given its ordinary and customary meaning to a person of ordinary skill in the art and is not to be limited to a special or customized meaning. The term specifically may refer, without limitation, to a plurality of process steps to be performed subsequently and/or in parallel. The algorithm specifically may comprise one or more mathematical operations to be applied to at least one input variable. Consequently, the term "transformation algorithm" specifically may refer to an algorithm which performs a transforming process for transforming the material property into RGB values by using one or more mathematical operations to be applied to the at least one input variable. The transformation of the material property into RGB values may take place in a single step or in a plurality of steps.

The transforming of the material property into RGB values may comprise subjecting the at least one material property to at least one test, specifically to at least one predetermined test. The at least one test may be or may comprise comparing the at least one material property directly or indirectly, such as by using the at least one item of measurement information, with at least one comparison value, at least one comparison value range or the like. Other mathematical tests are generally feasible and may also be applied. In accordance with the result of the at least one test, the RGB values may be generated. The transforming of the material property into RGB values specifically may comprise comparing the at least one material property, including the option of using the at least one item of measurement information representing the material property, with at least one threshold value. In accordance with the result of this comparison, for each primary color at least one number may be assigned to the material property.

Preferably, the first digital RGB image may be generated by scanning, in particular digital scanning, the blend, or at least a region of interest of the blend. The digital scanning may be performed using at least one scanning device. The term "scanning device" as used herein is a broad term and is to be given its ordinary and customary meaning to a person of ordinary skill in the art and is not to be limited to a special or customized meaning. The term specifically may refer, without limitation, to a device configured for detecting at least one property of at least one object and/or element, e.g. of the blend. In particular, the scanning device may be configured for examining and/or detecting at least one material property of the blend. As an example, the scanning device may have at least one scanning element configured for optically recording and/or capturing spatially resolved one-dimensional, two-dimensional or even three-dimensional optical information on the blend. Thus, e.g. for optical detection, the scanning device may, for example, comprise at least one sensor, such as optical sensors, specifically image sensors, e.g. at least one light sensitive capacitor, at least one charge-coupled device (CCD). The scanning device may for example comprise at least one CCD-chip and/or at least one CMOS chip. Specifically, the scanning device may be configured for detecting optical signals of the blend, e.g. of the blended and/or merged powder components, such as by using an optical system. In particular, the scanning system may be configured for convert, e.g. break down, the optical signals of the blend into primary colors, such as into red, green and blue, e.g. by using a prism. The scanning device may specifically be configured for converting the optical signals, such as the optical signals converted into primary colors, into at least one digital image, e.g. by using at least one sensor, such as a sensor comprising a plurality of light-sensitive capacitors. Further, the scanning device may comprise at least one illuminating element, such as an element configured for illuminating the blend, wherein the scanning device may be configured for detecting the at least one property of the blend by using a reflection of the blend. Herein, the scanning device may also be referred to as scanner. The scanning device may specifically be or may comprise a device selected from the group consisting of: a CCD scanner; a CIS scanner; a camera; a film. In particular, the scanning device may comprise at least one optical detection system, specifically comprising one or more of an optical detector, an image sensor, for example a photomultiplier tube (PMT), e.g. a vacuum tube converting incident photons into an electric signal, a silicon photomultiplier (SiPM), e.g. a solid-state device converting incident photons into an electric signal. The scanning device may specifically comprise at least one processor, wherein the processor may be configured for controlling at least one scanning operation of the scanning device.

Scanning may for example be performed using light of a wavelength at scanning in the range of from 10 nm to 1 mm, preferably in the range of from 300 nm to 800 nm. The luminous intensity per m$^2$ of the light used preferably is in the range of from 0.001 lm/m$^2$ and 10000000 lm/m$^2$, more preferable in the range of from 10 lm/m$^2$ and 1000000 lm/m$^2$.

Step i) may comprise generating a digital image element by sizing the first digital RGB image to a pre-defined size. The size of digital image element may be larger than a size of the first transaction data. The term "digital image element" as used herein is a broad term and is to be given its ordinary and customary meaning to a person of ordinary skill in the art and is not to be limited to a special or customized meaning. The term specifically may refer, without limitation, to a section or cutout of the first digital RGB image. The term "sizing" as used herein is a broad term and is to be given its ordinary and customary meaning to a person of ordinary skill in the art and is not to be limited to a special or customized meaning. The term specifically may refer, without limitation, to adapting and/or selecting and/or reducing and/or cutting the full first digital RGB image to a digital image element comprising a region of interest.

The transaction may comprise financial transactions such as payments, licensing, orders, invoices, and/or logistic transactions such as deliveries, storage records, travel records, and/or transactions relating to plans, and/or tax declarations, and/or contracts, and/or personal health information and the like.

The term "transaction data" as used herein is a broad term and is to be given its ordinary and customary meaning to a person of ordinary skill in the art and is not to be limited to a special or customized meaning. The term specifically may refer, without limitation, to data describing at least one transaction. The transaction data may comprise information about one or more of time of transaction, a numerical value of the transaction a text of the transaction, a digital picture of the transaction, a text of the transaction, a digital image of the transaction and the like. The transaction data may be provided in binary format.

The term "combining" data, such as the first transaction data, and a digital RGB image, as used herein is a broad term and is to be given its ordinary and customary meaning to a person of ordinary skill in the art and is not to be limited to a special or customized meaning. The term specifically may refer, without limitation, to adding and/or mapping the data to the pixel information of the digital RGB image. Specifically, the combining of the data and the digital RGB image may comprise adding a binary code of the data to a binary code of the digital RGB image.

The hashing may be performed by mapping the transaction data or other information with a digital picture, which leads to a new digital picture of RGB colors. The combining of the first transaction data and the first digital RGB image may comprise adding a binary code of the transaction to a binary code of the RGB colors of the first digital RGB image. In particular, step ii) comprises determining the binary code of the first digital RGB image and adding the binary code of the first transaction data to the binary code of the first digital RGB image. The combining may comprise mapping the transaction data with the digital image element. Vectors for position of colors are not changed.

The combining may be performed as follows. Color values of each pixel of the first digital RGB image may be converted into hexadecimal numerals. For example, the conversion of the color values into hexadecimal numerals may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The hexadecimal numerals may be further converted into the binary code of the first digital RGB image, for example, by using at least one mathematical algorithm and/or at least one pre-determined relationship such as a look-up table, e.g. as described in ""Improving Image Performance by Using Color Lookup Tables, Adobe developer support, Technical Note #5121, 31 Mar. 1992 or https://www.rgbtohex.net/hextorgb/.

The binary code of the first digital RGB image and the first transaction data may be added. The added binary codes may be converted into hexadecimal numbers which may be converted into color values. For example, the conversion of hexadecimal numerals into the color values may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The second RGB image may be generated by using the determined color values for the corresponding image pixels. The second RGB image may be a second digital RGB image. The second RGB image may differ from the first digital RGB image. In particular, the pixels of the first digital RGB image and the second RGB image have different color values.

Then, the new image, i.e. the second RGB image, may be digitally converted from RGB colors to the secondary color space. The term "secondary color space", as used herein is a broad term and is to be given its ordinary and customary meaning to a person of ordinary skill in the art and is not to be limited to a special or customized meaning. The term specifically may refer, without limitation, to an arbitrary color space having a suitable number of primary colors, i.e. at least four primary colors. Preferably, the secondary color space is the CMYK color space, wherein the primary colors of the secondary color space are black, cyan, magenta, yellow and white, whereby white is meant as no color on a white substrate. The conversion from the RGB color space to the secondary color space may be performed for each pixel of the second RGB image. The conversion from the RGB color space to the secondary color space may be performed using at least one mathematical algorithm and/or at least one pre-determined relationship such as a look-up table, e.g. as described for the conversion of the RGB color space into CMYK color space in U.S. Pat. No. 5,283,671 A, "Schule der Farben—Grundzüge der Farbentheorie für Computeranwender und andere", Küppers, Harald, DuMont Buchverlag, Köln 2. Edition, ISBN 978-3-7701-2841-9, pages 125-134, or www.farbtabelle.at/farben-umrechnen. The conversion from the RGB color space may be performed using at least one software, in particular a software of the printer for converting the RGB colors.

The converted image may be further transformed into a pattern. The pattern may be a grid. The pattern may comprise at least one matrix comprising rows and columns indicating the presence or absence of primary colors of the respective pixel. The further transformation, in particular rastering, may be performed by the printer software. Next, the colored dots may be counted. The determining of the number of respectively colored pixels for each primary color of the secondary color space may comprise counting colored dots of the converted and rastered image, in particular of the matrices.

The determined number of pixels of each primary color may be converted to hexadecimal numerals. Specifically, the color dot numbers are transferred to hexadecimal numerals. The conversion of the determined number into hexadecimal numerals into the color values may be performed using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/.

The generating of the hash value may comprises converting the determined number of respectively colored pixels for each primary color of the secondary color space via a pre-defined formula to fixed-size hexadecimal values. Specifically, the determined number of pixels of each primary color may be converted to a fixe-size value without decimal digits. The pre-defined formula may be a logarithmic formula. The information of the counted dots may be transferred into hexadecimal numerals via a logarithmic formula to fixed-size values—which is necessary for hashing any transaction. The pre-defined mathematical formula for converting the determined number of respectively colored pixels for each primary color of the secondary color space to fixed-size hexadecimal values may be "a+b*x+c*(x/16)+d*1000*ln(x+1), wherein "x" is the number of pixels of each primary color and a, b, c and d are parameters. For example, for generating 4-digit hexadecimal numerals, the value of "a" may be 4,096 for all of the following cases: In case of the sum of all pixels of each primary color is smaller than 60,000, "b" is 1, "c" and "d" are 0; in case of the sum of all pixels of each primary color is between 60,000 and 950,000, "c" is 1, "b" and "d" are 0. In case of the sum of all pixels of each primary color is larger than 950,000, "d" is 1, "b" and "c" are 0. Thereby, the result from the calculation by the predefined formula may be rounded down to full hexadecimal numerals." For example, for generating hash values of other fixed-size than 4-digit hexadecimal numerals, e.g. 3-digit or 10-digit, "a", "b", "c" and "d" may be adjusted accordingly.

As the method is about the depiction of 2-dimensional information, i.e. the digital image, to a one-dimensional value, the hexadecimal number, this method is fulfilling the requirements of a cryptographic hash function. Specifically, the number of different RGB colors of a standard RGB image may be larger than 16 million per pixel meaning an image of 10 mega-pixels may have more than 100 trillion variables of color information. Due to the large amount of color information, the risk of hash collusion should be very low. Specifically, by generating the hash value by using a first digital RGB image of locally generated blend of mixed pigments and thus, of billions of particles, tracing of hash generation is not possible. Moreover, the hash value is extremely secure because of the high amount of possible colors of each of the pixel and of the image. The amount of possible colors may depend on the image size and of the resolution of the scanner. Thus, the amount of possible color may even increase in the future in view of increasing camera resolution.

The method may comprise printing of the transaction data on a substrate. The method may comprise printing the second RGB image on a substrate, and by printing the hexadecimal numeral of the hash value on the same substrate. This may allow transporting the transaction physically to a further place where the printout can be read-in by a scanning device and can be transformed back into the second digital RGB image. The method may comprise verification of the printed transaction data by verifying the second digital RGB image. By comparing the number of the color dots (c-m-y-k-"w") of the printed second digital RGB image with the hash-value may allow observing of the transaction was manipulated, because the image was changed. The verification may comprise determining of the transaction was manipulated. The method may comprise scanning the printed second digital RGB image and determining the number of respectively colored pixels of the secondary color space on the substrate, by converting the determined number of respectively colored pixels for each primary color of the secondary color space to hexadecimal numerals, by comparing the hexadecimal numerals with the hexadecimal numeral of the hash value printed on the substrate.

As outlined above, the method for generating a hash value as disclosed herein may fully or partially be computer-implemented by at least one computer or computer network. Step i) may also be partially computer-implemented or computer-supported. Consequently, the invention also discloses a computer program and a computer program product having program code means, in order to fully or partially perform or support the method for generating a hash value according to the present invention in one or more of the embodiments enclosed herein when the computer program product or the computer program is executed on a computer or computer network. Specifically, the program code means may be stored on a computer-readable data carrier and/or on a computer-readable storage medium. As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

In a further aspect of the present invention, a computer implemented method for generating a root-hash is disclosed. The method may comprise generating a hash tree, also denoted Merkle tree. Generally, as outlined in en.wikipedia.org/wiki/Merkle_tree, a hash tree has leaves which are hashes. The hash tree may have a plurality of hashes. The term "root-hash", as used herein is a broad term and is to be given its ordinary and customary meaning to a person of ordinary skill in the art and is not to be limited to a special or customized meaning. The term specifically may refer, without limitation, to a top of a hash tree, also denoted master hash.

The method comprises determining a first hash value by using the method according to the present invention for generating a hash value as described above or as described in more detail below. For possible definitions, options or embodiments, reference may be made to the description given above.

The method for generating a root-hash comprises the following method steps which, specifically, may be performed in the given order. Still, a different order is also possible. It is further possible to perform two or more of the method steps fully or partially simultaneously. Further, one or more or even all of the method steps may be performed once or may be performed repeatedly, such as repeated once or several times. Further, the method may comprise additional method steps which are not listed.

The generating of the root-hash comprises the following steps:
a) Combining second transaction data and the first digital RGB image, thereby generating a third RGB image having third RGB colors;
b) Converting colors values of the third RGB image from RGB color space to the secondary color space and determining a number of respectively colored pixels for each primary color of the secondary color space;
c) Generating a further hash value by converting the determined number of respectively colored pixels for each primary color of the secondary color space to hexadecimal numerals;
d) Generating the root hash by aggregation of the first hash value and the further hash value.

The combining of the second transaction data and the first digital RGB image may be performed analogous as described with respect to the combination of the first transaction data and the first digital RGB image. As the second transaction data is different from the first transaction data, the third RGB image has different RGB color values than the second RGB image. The combining of the first digital RGB image may comprise determining and/or obtain a further digital image from the first digital image such as by extracting and/or sizing and the like. The further digital image may be combined with the second transaction data.

The converting of the color values of the third RGB image to the secondary color space may be performed analogous as described with respect to the conversion of the second RGB image to the secondary color space. The generating of the further hash value may be performed analogous as described with respect to the generating of the first hash value.

Thus, in principle, in steps a) to c) the hashing routine of the method according to the present invention for generating a hash value as described above or as described in more detail below is repeated for the second transaction data. As the second transaction data is different from the first transaction data, the third RGB image has different RGB color values than the second RGB image such that the resulting further hash value is different from the first hash value.

Step d) comprises generating the root hash by aggregation of the first hash value and the further hash value. Techniques for aggregation of the first hash value and the further hash value to a root hash are known by the skilled person. For example, the first hash value and the further hash value may be added up.

The method may be repeated. Specifically, the method may comprise generating further hash values for further transaction data and generating the root hash by aggregation of the hash values.

The method for generating a root-hash as disclosed herein may fully or partially be computer-implemented by at least one computer or computer network. Consequently, the invention also discloses a computer program and a computer program product having program code means, in order to fully or partially perform or support the method for generating a root-hash according to the present invention in one or more of the embodiments enclosed herein when the computer program product or the computer program is executed on a computer or computer network. Specifically, the program code means may be stored on a computer-readable data carrier and/or on a computer-readable storage medium. The computer-readable data carrier or storage medium specifically may be or may comprise a storage medium such as a random-access memory (RAM) and/or a read-only memory (ROM).

In a further aspect of the present invention, a computer implemented method for generating a nonce is disclosed. The term "nonce", as used herein is a broad term and is to be given its ordinary and customary meaning to a person of ordinary skill in the art and is not to be limited to a special or customized meaning. The term specifically may refer, without limitation, to an arbitrary number that can only be used once (1-dimensional).

The method for generating a nonce comprises the following method steps which, specifically, may be performed in the given order. Still, a different order is also possible. It is further possible to perform two or more of the method steps fully or partially simultaneously. Further, one or more or even all of the method steps may be performed once or may be performed repeatedly, such as repeated once or several times. Further, the method may comprise additional method steps which are not listed.

The method comprises the following steps:
generating a digital RGB image having RGB colors by scanning a physical object;
generating the nonce by determining a binary code of the digital RGB image.

With respect to generating of the digital RGB image reference is made to the description of generating the first RGB image.

The determining of the binary code of the digital RGB image may comprise converting color values of each pixel of the digital RGB image into hexadecimal numerals. For example, the conversion of the color values into hexadecimal numerals may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The hexadecimal numerals may be further converted into the binary code of the digital RGB image, for example, by using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/. The nonce may be the code of the RGB colors, but not of image vectors.

The method for generating a nonce as disclosed herein may fully or partially be computer-implemented by at least one computer or computer network. The step of generating a digital RGB image may also be partially computer-implemented or computer-supported. Consequently, the invention also discloses a computer program and a computer program product having program code means, in order to fully or partially perform or support the method for generating a nonce according to the present invention in one or more of the embodiments enclosed herein when the computer program product or the computer program is executed on a computer or computer network. Specifically, the program code means may be stored on a computer-readable data carrier and/or on a computer-readable storage medium. The computer-readable data carrier or storage medium specifically may be or may comprise a storage medium such as a random-access memory (RAM) and/or a read-only memory (ROM).

In a further aspect of the present invention, a computer implemented method for generating a blockchain is disclosed.

The method comprises generating a plurality of subsequent linked blocks of the blockchain. The method comprises generating a genesis block by generating a first digital RGB image having first RGB colors by scanning a physical object. The method comprises generating a subsequent block by determining a binary code of the first digital RGB image and adding the binary code of the first digital image to information to be mapped thereby generating a second RGB image having second RGB colors. This process is repeated for each further block until the blockchain is closed.

The term "block", as used herein is a broad term and is to be given its ordinary and customary meaning to a person of ordinary skill in the art and is not to be limited to a special or customized meaning. The term specifically may refer, without limitation, to a component or an element of the blockchain. Blockchains can be defined as a chain of blocks which can hold certain records and the blocks are linked to one another using the principles of cryptography, for further details see "Eshani et al, "A study on the issue of blockchain's energy consumption", Chapter 2, DOI: 10.1007/978-981-15-0361-0_5 or en.wikipedia.org/wiki/Blockchain. Each block may comprise transaction data. The blocks may be linked by comprising the hash value of the previous block. Each block comprises a cryptographic hash of the previous block. Each block may further comprise a timestamp.

The term "genesis block", as used herein is a broad term and is to be given its ordinary and customary meaning to a person of ordinary skill in the art and is not to be limited to a special or customized meaning. The term specifically may refer, without limitation, to the first block or block0 of the blockchain. With respect to generating of the first digital RGB image reference is made to the description of generating the first RGB image as described in detail above or in more detail below.

As outlined above the method may be repeated. For example, the method may comprise generating a third block by determining a binary code of the second digital RGB image and adding the binary code of the second RGB image to further information to be mapped thereby generating a third digital RGB image having third RGB colors. The blockchain may comprise a plurality blocks such as three, four, five, ten, twenty or more blocks.

The determining of the binary code of the first digital RGB image may comprise converting color values of each pixel of the first digital RGB image into hexadecimal numerals. For example, the conversion of the color values into hexadecimal numerals may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The hexadecimal numerals may be further converted into the binary code of the first digital RGB image, for example, by using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/.

The term "information to be mapped", as used herein is a broad term and is to be given its ordinary and customary meaning to a person of ordinary skill in the art and is not to be limited to a special or customized meaning. The term specifically may refer, without limitation, to any kind of information or data to be stored in the block. For example, the information to be mapped comprises one or more of transaction data, a root hash, a nonce, the previous hash value, a timestamp. The method may comprises determining for each generated block a root-hash by using a method for generating a root-hash according to the present invention and adding the root-hash to the block. The method may comprise determining for each generated block a nonce by using a method for generating a nonce according to the present invention and adding the nonce to the block. The method may comprise adding a timestamp of the respective transaction to each of the generated blocks. The method may comprises adding the hash value of the preceding block to each of the generated blocks. The hash value may be determined by using a method for generating a hash value according to the present invention. The information to be mapped may be present in binary format, in particular as a binary code.

The added binary codes of the first digital RGB image and of the information to be mapped may be converted into hexadecimal numbers which may be converted into color values. The conversion of the binary code into hexadecimal numerals may be performed, for example, by using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/. For example, the conversion of hexadecimal numerals into the color values may be performed using at least one mathematical algorithm and/or at least one pre-determined relationship such as a look-up table, e.g. as described in www-.farben-umrechnen.de or "The Image-Interface: Graphical Supports for Visual Information", Everardo Reyes-Garcia, John Wiley & Sons, 2017, ISBN 978-1-1194-7497-5. The second RGB image may be a second digital RGB image. The second RGB image may differ from the first digital RGB image. In particular, the pixels of the first digital RGB image and the second RGB image have different color values.

For each further set of transactions a next subsequent block may be generated by determining a binary code of the digital image of a preceding block and adding further information to be mapped to the binary code of the digital RGB image of the preceding block, thereby generating a next digital RGB image having further RGB colors. The set of transactions may comprise one or more transactions. The added binary codes of the digital RGB image of the preceding block and of the further information to be mapped may be converted into hexadecimal numbers which may be converted into color values. The color values may be used for the corresponding pixels of the next digital RGB image, i.e. for the next block.

The method may further comprise encrypting the generated blocks. The term "encrypt" as used herein is a broad term and is to be given its ordinary and customary meaning to a person of ordinary skill in the art and is not to be limited to a special or customized meaning. The term specifically may refer, without limitation, to the process of modifying one or more of a message, information or data, by using at least one encryption means, also referred to as an encryption key, such that only authorized parties can access it and those who are not authorized cannot. The modified data, as generated by the encryption process, may also be referred to as "encrypted data". Specifically, the encryption may comprise a process of modifying one or more of a message, information or data in such a way that only a person being in possession of specific authorization means, also referred to as an encryption key, may transform the modified message, information or data into its original or readable form and, thereby, may retrieve the original message, information or data. The encrypting or encryption process, i.e. the process of modifying the message, information or data specifically may involve an encryption algorithm, by combining the message, information or data with at least one encryption key. As an example, in a binary format, each bit of the message, information or data may be combined with a corresponding bit of the encryption key, thereby generating an encrypted bit. Other encryption algorithms are generally known and may also be used in the context of the present invention.

The term "encryption key" as used herein is a broad term and is to be given its ordinary and customary meaning to a person of ordinary skill in the art and is not to be limited to a special or customized meaning. The term specifically may refer, without limitation, to an encryption means or decryption means used in an encryption process or in a decryption process, respectively. The term specifically may refer to an item of information that determines the functional output of a cryptographic algorithm such as an encryption process and/or the decryption process. Encryption keys may also specify transformations in other cryptographic algorithms, such as digital signature schemes and message authentication codes.

For the process of encryption and for the process of decryption, identical keys may be used. Thus, both for the key used in the encryption process and for the key used in the decryption process, the term "encryption key" is typically used. Still, besides symmetric encryption and decryption processes, also asymmetrical processes are generally possible, i.e. processes in which the keys used for encryption and for decryption are not identical. Still, in the terminology of the present invention, the term "encryption key" is used both for the key used in encryption and for the key used in decryption. The present invention may refer to the symmetrical encryption processes. Still, asymmetric encryption processes are also possible.

The encryption key may be generated by transforming the material property of the blending detected by the scanning device into the encryption key by using the at least one data processing device configured for applying at least one transformation algorithm to the material property.

The transforming of the at least one material property into the at least one encryption key may take place in a computer-implemented fashion. The transformation of the material property into the encryption key may take place in a single step or in a plurality of steps. The transforming of the material property into the encryption key, as an example, may take place by providing at least one electronic signal, such as digital information, representative for the at least one material property to the at least one data processing device for further processing. Thus, as an example, the detector may directly or indirectly communicate with the data processing device or may even be part of the data processing device. Thus, the at least one material property may directly or indirectly be provided to the data processing device for further processing and four directly or, after preprocessing, applying the at least one transformation algorithm. The result of the transforming process may be the encryption key, wherein the encryption key, as an example, may be provided in an electronic fashion. As an example, the encryption key may be or may comprise electronic information in a digital or analogue format. The encryption key, as an example, may be provided to one or more of a data storage device, and interface, a third-party or the like.

It shall be outlined that the encryption key may be generated in a single step or in a plurality of steps. Thus, the encryption key may also be generated iteratively, e.g. by repeating the steps of blending and detecting and, optionally, transforming, wherein, e.g., in each step of blending and detecting, a part of the encryption key is generated and/or further blending information is generated, for a further blending step. Thereby, complex and large encryption keys may be generated iteratively, even though the number of material properties of a single blend may be limited.

The transforming of the material property into the encryption key, specifically may comprise subjecting the at least one material property to at least one test, specifically to at least one predetermined test. As an example and as will be outlined in further detail below, the at least one test may be or may comprise comparing the at least one material property directly or indirectly, such as by using the at least one item of measurement information, with at least one comparison value, at least one comparison value range or the like. Other mathematical tests are generally feasible and may also be applied. In accordance with the result of the at least one test, the encryption key or at least a part thereof may be generated. The transforming of the material property into the encryption key specifically may comprise comparing the at least one material property, including the option of using the at least one item of measurement information representing the material property, with at least one threshold value. In accordance with the result of this comparison, at least one number may be assigned to the material property. The number specifically may be a binary number. The number may directly form the encryption key or may form part of the encryption key. Thus, as an example, the encryption key may comprise a plurality of its values, wherein at least one of the bit values is assigned in accordance with the result of a comparison of a material property with at least one threshold value. As an example, a spectrum or distribution of at least one material property of the blend may be measured, such as a distribution of colors. In accordance with e.g. the statistical occurrence of a specific color or with the statistical occurrence of another specific feature or property of the blend, a specific bit value may be chosen. Other bit values may be chosen accordingly, e.g. in accordance with other specific features of properties of the blend. Thereby, the full encryption key or at least a part thereof may be generated.

The encryption may be performed using at least one data encryption system. The term "data encryption system" as used herein is a broad term and is to be given its ordinary and customary meaning to a person of ordinary skill in the art and is not to be limited to a special or customized meaning. The term specifically may refer, without limitation, to a device, a combination of devices or a component or combination of components configured for encrypting data. The data encryption system may fully or partially be embodied as a computer or computer system or may be comprised in a computer or computer system. The data encryption system may comprise:

- at least one an encryption key generating device according to the present invention, such as according to any one of the embodiments disclosed above or disclosed in further detail below, referring to an encryption key generating device; and
- at least one encryption device configured for encrypting the data by using the encryption key, thereby generating encrypted data.

The method may further comprise at least one decrypting step, wherein the encrypted block is decrypted. The term "decrypt" as used herein is a broad term and is to be given its ordinary and customary meaning to a person of ordinary skill in the art and is not to be limited to a special or customized meaning. The term specifically may refer, without limitation, to the reverse process of the above-described process of encryption. The term specifically may refer, without limitation, to the process of re-modifying encrypted data, by using at least one decryption means, also referred to as an encryption key, such that the encrypted data is transformed into the readable format, i.e. into one or more of the original message, information or data in a readable format. The process of modifying the encrypted data specifically may involve a decryption algorithm, e.g. combining the encrypted data with the at least one encryption key. As an example, in a binary format, each bit of the encrypted data may be combined with a corresponding bit of the encryption key, thereby generating a decrypted bit. Other decryption algorithms are generally known and may also be used in the context of the present invention. The decryption may be performed using at least one decryption device configured for decrypting the encrypted data by using the encryption key. The term "decryption device" as used herein is a broad term and is to be given its ordinary and customary meaning to a person of ordinary skill in the art and is not to be limited to a special or customized meaning. The term specifically may refer, without limitation, to an arbitrary device configured for performing the step of decrypting the data. The decryption device specifically may comprise at least one processor configured for performing the decrypting, as outlined above. The decryption device may fully or partially be embodied in software running on at least one computer.

The method may comprise a printing step, wherein at least one block, i.e. one digital RGB image is printed.

The method for generating a blockchain as disclosed herein may fully or partially be computer-implemented by at least one computer or computer network. The step of generating a digital RGB image may also be partially computer-implemented or computer-supported. Consequently, the invention also discloses a computer program and a computer program product having program code means, in order to fully or partially perform or support the method for generating a blockchain according to the present invention in one or more of the embodiments enclosed herein when the computer program product or the computer program is executed on a computer or computer network. Specifically, the program code means may be stored on a computer-readable data carrier and/or on a computer-readable storage medium. The computer-readable data carrier or storage medium specifically may be or may comprise a storage medium such as a random-access memory (RAM) and/or a read-only memory (ROM).

In a further aspect of the present invention, a blockchain based on digital images is disclosed. The blockchain comprises a plurality of linked blocks. The blockchain is generated by using a method for generating a blockchain according to the present invention as described above or as described in more detail below. Thus, for definitions and embodiments reference is made to the description the method for generating a blockchain.

For the physical transfer of the transaction data from one node to another node, the RGB image of the transaction generated by mapping the transaction data may be printed on a substrate as well as the hash value of the transaction data is printed on the same substrate. The verification, if the printed transaction data is not manipulated, may be performed by scanning the printed RGB image of the transaction and by determining the number of respectively colored pixels of the secondary color space on the substrate, by converting the determined number of respectively colored pixels for each primary color of the secondary color space to hexadecimal numerals, by comparing this hexadecimal numeral with the hexadecimal numeral printed on the substrate. The verification, that the transaction data are not manipulated may be successful, if the hexadecimal numeral of the scanned authentication image is the same as the hexadecimal numeral of the hash value of the transaction data.

In a further aspect of the present invention, crypto currency is disclosed. The crypto currency may be configured for working as a medium of exchange wherein individual coin ownership records are stored in a blockchain, in particular in a blockchain according to the present invention. The blockchain may allow controlling transfer and ownership of crypto currency units. A crypto currency unit may be a unit of arbitrary size.

Transaction of the crypto currency may be performed according to the following method:

Method for transferring crypto currency, wherein each transaction of the crypto currency unit is done by performing the following steps:

Generating a digital RGB image having RGB colors by scanning a physical object;

Combining first transaction data and the digital RGB image, thereby generating an intermediate RGB image;

Combining identity information and the intermediate RGB image, thereby generating an authentication image having further RGB colors;

Converting color values of the authentication image from RGB color space to a secondary color space having at least four primary colors and determining a number of respectively colored pixels for each primary color of the secondary color space;

Generating a one-time verification number by converting the determined number of respectively colored pixels for each primary color of the secondary color space to hexadecimal numerals.

With respect to generating of a digital RGB image reference is made to the description of generating the first RGB image as described in detail above or in more detail below.

The transferring of the crypto currency may comprise generating at least one crypto currency unit, wherein the generating comprises considering first transaction data thereby transferring crypto currency.

The combining of the first transaction data and the digital RGB image may comprise determining a binary code of the digital RGB image. The determining of the binary code of the digital RGB image may comprise converting color values of each pixel of the digital RGB image into hexadecimal numerals. For example, the conversion of the color values into hexadecimal numerals may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The determined hexadecimal numerals may be further converted into the binary code of the digital RGB image, for example, by using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/. The added binary codes of the digital RGB image and of the first transaction data may be converted into hexadecimal numbers which may be converted into color values. For example, the conversion of hexadecimal numerals into the color values may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The intermediate RGB image may be generated by using the determined color values for the corresponding image pixels. The term "intermediate RGB image" as used herein is a broad term and is to be given its ordinary and customary meaning to a person of ordinary skill in the art and is not to be limited to a special or customized meaning. The term specifically may refer, without limitation, to a digital image, in particular a digital RGB image, comprising the transaction data.

The term "identity information" as used herein is a broad term and is to be given its ordinary and customary meaning to a person of ordinary skill in the art and is not to be limited to a special or customized meaning. The term specifically may refer, without limitation, to arbitrary information providing unique identification of a value owner. The term "authentication image" as used herein is a broad term and is to be given its ordinary and customary meaning to a person of ordinary skill in the art and is not to be limited to a special or customized meaning. The term specifically may refer, without limitation, to a digital image, in particular a digital RGB image, comprising the identity information.

The combining of the identity information and the intermediate RGB image may comprise determining a binary code of the intermediate RGB image. The determining of the binary code of the intermediate RGB image may comprise converting color values of each pixel of the intermediate RGB image into hexadecimal numerals. For example, the conversion of the color values into hexadecimal numerals may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The determined hexadecimal numerals may be further converted into the binary code of the intermediate RGB image, for example, by using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/. The added binary codes of the intermediate RGB image and of identity information may be converted into hexadecimal numbers which may be converted into color values. For example, the conversion of hexadecimal numerals into the color values may be performed using at least one mathematical algorithm and/or at least one pre-determined relationship such as a look-up table, e.g. as described in www-.farben-umrechnen.de or "The Image-Interface: Graphical Supports for Visual Information", Everardo Reyes-Garcia, John Wiley & Sons, 2017, ISBN 978-1-1194-7497-5. The authentication image may be generated by using the determined color values for the corresponding image pixels.

The authentication image may be digitally converted from RGB colors to a secondary color space. Preferably, the secondary color space is the CMYK color space, wherein the primary colors of the secondary color space are black, cyan, magenta, yellow and white, whereby white is meant as no color on a white substrate. The conversion from the RGB color space to the secondary color space may be performed for each pixel of the authentication image. The conversion from the RGB color space to the secondary color space may be performed using at least one mathematical algorithm and/or at least one pre-determined relationship such as a look-up table, e.g. as described for the conversion of the RGB color space into CMYK color space in U.S. Pat. No.

5,283,671A, or in "Schule der Farben—Grundzüge der Farbentheorie für Computeranwender and andere", Küppers, Harald, DuMont Buchverlag, Köln 2. Edition, ISBN 978-3-7701-2841-9, pages 125-134 or www.farbtabelle.at/farben-umrechnen. The conversion from the RGB color space may be performed using at least one software, in particular a software of the printer for converting the RGB colors.

The converted image may be further transformed into a pattern. The pattern may be a grid. The pattern may comprise at least one matrix comprising rows and columns indicating the presence or absence of primary colors of the respective pixel. The further transformation, in particular rastering, may be performed by the printer software. Next, the colored dots may be counted. The determining of the number of respectively colored pixels for each primary color of the secondary color space may comprise counting colored dots of the converted and rastered image, in particular of the matrices.

The determined number of pixels of each primary color may be converted to hexadecimal numerals. Specifically, the color dot numbers are transferred to hexadecimal numerals. The conversion of the determined number into hexadecimal numerals into the color values may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5.

The generating of the one-time verification number may comprises converting the determined number of respectively colored pixels for each primary color of the secondary color space via a pre-defined formula to fixed-size hexadecimal values. Specifically, the determined number of pixels of each primary color may be converted to a fixed-size value without decimal digits. The pre-defined formula may be a logarithmic formula. The information of the counted dots may be transferred into hexadecimal numerals via a logarithmic formula to fixed-size values—which is necessary for hashing any transaction. The pre-defined mathematical formula for converting the determined number of respectively colored pixels for each primary color of the secondary color space to fixed-size hexadecimal values may be "a+b*x+c(x/16)+d*1000*ln(x+1), wherein "x" is the number of pixels of each primary color and a, b, c and d are parameters. For example, for generating 4-digit hexadecimal numerals, the value of "a" may be 4,096 for all of the following cases: In case of the sum of all pixels of each primary color is smaller than 60,000, "b" is 1, "c" and "d" are 0; in case of the sum of all pixels of each primary color is between 60,000 and 950,000, "c" is 1, "b" and "d" are 0. In case of the sum of all pixels of each primary color is larger than 950,000, "d" is 1, "b" and "c" are 0. Thereby, the result from the calculation by the predefined formula may be rounded down to full hexadecimal numerals." For example, for generating hash values of other fixed-size than 4-digit hexadecimal numerals, e.g. 3-digit or 10-digit, "a", "b", "c" and "d" may be adjusted accordingly.

The term "one-time verification number" as used herein is a broad term and is to be given its ordinary and customary meaning to a person of ordinary skill in the art and is not to be limited to a special or customized meaning. The term specifically may refer, without limitation, to a number which can be used for verification of the crypto currency unit, in particular to prevent counterfeiting. The generating of the unit of the crypto currency may comprise printing the crypto currency unit. The printed crypto currency unit may comprise a printout of the authentication image and a verification number. By scanning and decoding the authentication image the one-time verification number can be extracted. The extracted one-time verification number can be compared to the verification number on the printout. If they match the crypto currency unit is verified. Forgery thus is impossible due to link of the image with the one-time verification number, which is saved in the blockchain.

The transaction of the crypto currency unit may comprise printing the crypto currency unit. The printing of the crypto currency unit may comprise printing the authentication image on a substrate and printing the hexadecimal numeral of the one-time verification number on the same substrate. Hexadecimal numbers may be also translated into bar codes or QR codes for easy scanning purposes. The printing may allow for transfer of the transaction data physically from one node to another node, like a banknote.

For the physical transfer the crypto currency value by the owner of the crypto currency value from one node to another node, the authentication image may be printed on a substrate as well as the one-time verification number is printed on the same substrate. The verification, if the printed crypto currency value is not manipulated, may be performed by scanning the printed authentication image and by determining the number of respectively colored pixels of the secondary color space on the substrate, by converting the determined number of respectively colored pixels for each primary color of the secondary color space to hexadecimal numerals, by comparing this hexadecimal numeral with the hexadecimal numeral printed on the substrate.

For example, at a node, the number of respectively colored pixels for each primary color of the secondary color space (c-m-y-k-"w") of the authentication image may be determined by a scanning device, may be transformed into hexadecimal numerals and may be compared to the one-time verification number (which is the hash value of the transaction). If both hexadecimal numerals are identical the authentication image is considered not to be manipulated and the transaction can be processed, e.g. an amount of money in Euros may be payed out. The verification of crypto currency value and the identity of the owner of the crypto currency value may be successful, if the hexadecimal numeral of the scanned authentication image is the same as the hexadecimal numeral of the one-time verification number.

In a further aspect of the present invention, crypto currency is disclosed. Each crypto currency unit is generated by performing the following steps:

Generating a digital RGB image having RGB colors by scanning a physical object;

Combining first transaction data and the digital RGB image, thereby generating an intermediate RGB image;

Combining identity information and the intermediate RGB image, thereby generating an authentication image having further RGB colors;

Converting color values of the authentication image from RGB color space to a secondary color space having at least four primary colors and determining a number of respectively colored pixels for each primary color of the secondary color space;

Generating a one-time verification number by converting the determined number of respectively colored pixels for each primary color of the secondary color space to hexadecimal numerals.

With respect to definitions and embodiments reference is made to the method for transferring crypto currency.

The generating of the crypto currency unit may comprise printing the crypto currency unit, wherein the printing of the crypto currency unit may comprise printing the authentication image on a substrate, and printing the hexadecimal numeral of the one-time verification number on the same substrate.

In a further aspect of the present invention, a use of a blockchain according to the present invention, for a purpose of use, of trading crypto currency such as the crypto currency according to the present invention is disclosed.

Summarizing and without excluding further possible embodiments, the following embodiments may be envisaged:

Embodiment 1: Computer implemented method for generating a hash value, the method comprises the following steps:
  i) Providing a first digital RGB image having first RGB colors of a physical object;
  ii) Combining first transaction data and the first digital RGB image, thereby generating a second RGB image having second RGB colors;
  iii) Converting color values of the second RGB image from RGB color space to a secondary color space having at least four primary colors and determining a number of respectively colored pixels for each primary color of the secondary color space;
  iv) Generating the hash value by converting the determined number of respectively colored pixels for each primary color of the secondary color space to hexadecimal numerals.

Embodiment 2: The method according to the preceding embodiment, wherein providing of the first digital RGB image comprises blending and/or mixing pigments and scanning the blended and/or mixed pigments.

Embodiment 3: The method according to any one of the preceding embodiments, wherein the secondary color space is the CMYK color space, wherein the primary colors of the secondary color space are black, cyan, magenta, yellow and white.

Embodiment 4: The method according to any one of the preceding embodiments, wherein step i) comprises generating a digital image element by sizing the first digital RGB image to a pre-defined size, wherein the size of digital image element is larger than a size of the first transaction data.

Embodiment 5: The method according to any one of the preceding embodiments, wherein step ii) comprises determining a binary code of the first digital RGB image and adding a binary code of the first transaction data to the binary code of the first digital RGB image thereby generating the second digital RGB image having second RGB colors.

Embodiment 6: The method according to any one of the preceding embodiments, wherein step ii) comprises mapping the first transaction data to the first digital RGB image.

Embodiment 7: The method according to any one of the preceding embodiments, wherein generating of the hash value comprises converting the determined number of respectively colored pixels for each primary color of the secondary color space via a pre-defined formula to fixed-size hexadecimal values.

Embodiment 8: The method according to any one of the preceding embodiments, wherein the method comprises printing of the transaction data on a substrate, printing the second RGB image on the substrate and by printing the hexadecimal numeral of the hash value on the same substrate, wherein the method comprises verification of the printed transaction data, by verifying the second digital RGB image.

Embodiment 9: Computer implemented method for generating a root-hash, wherein the method comprises determining a first hash value by using the method for generating a hash value according to any one of the preceding embodiments, wherein the generating of the root-hash comprises the following steps:
  a) Combining second transaction data and the first digital RGB image, thereby generating a third RGB image having third RGB colors;
  b) Converting color values of the third RGB image from RGB color space to the secondary color space and determining a number of respectively colored pixels for each primary color of the secondary color space;
  c) Generating a further hash value by converting the determined number of respectively colored pixels for each primary color of the secondary color space to hexadecimal numerals;
  d) Generating the root hash by aggregation of the first hash value and the further hash value.

Embodiment 10: The method according to the preceding embodiment, wherein the method comprises generating further hash values for further transaction data and generating the root hash by aggregation of the hash values.

Embodiment 11: Computer implemented method for generating a nonce, the method comprises the following steps:
  generating a digital RGB image having RGB colors by scanning a physical object;
  generating the nonce by determining a binary code of the digital RGB image.

Embodiment 12: Computer implemented method for generating a blockchain, wherein the method comprises generating a plurality of subsequent linked blocks of the blockchain, wherein the method comprises generating a genesis block by generating a first digital RGB image having first RGB colors by scanning a physical object, wherein the method comprises generating a subsequent block by determining a binary code of the first digital RGB image and adding binary code of the first digital RGB image to information to be mapped thereby generating a second RGB image having second RGB colors, wherein this process is repeated for each further block until the blockchain is closed.

Embodiment 13: The method according to the preceding embodiment, wherein for each further set of transactions a next subsequent block is generated by determining a binary code of the digital image of a preceding block and adding further information to be mapped to the binary code of the digital RGB image of the preceding block, thereby generating a next digital RGB image having further RGB colors.

Embodiment 14: The method according to any one of the two preceding embodiments, wherein the method comprises determining for each generated block a root-hash by using a method for generating a root-hash according any one of the preceding embodiments relating to a method for generating a root-hash and adding the root-hash to the block, wherein the method further comprises determining for each generated block a nonce by using a method for generating a nonce according any one of the preceding embodiments relating to a method for generating a nonce and adding the nonce to the block, wherein the method further comprises adding a timestamp of the respective transaction to each of the generated blocks.

Embodiment 15: The method according to any one of the two preceding embodiments, wherein the method comprises adding the hash value of the preceding block to each of the generated blocks.

Embodiment 16: Blockchain based on digital images, wherein the blockchain comprises a plurality of linked blocks, wherein the blockchain is generated by using a method for generating a blockchain according to any one of the preceding embodiments relating to a method for generating a blockchain.

Embodiment 17: Method for transferring crypto currency, wherein each transaction of a crypto currency unit is done by performing the following steps:
 Generating a digital RGB image having RGB colors by scanning a physical object;
 Combining first transaction data and the digital RGB image, thereby generating an intermediate RGB image;
 Combining identity information and the intermediate RGB image, thereby generating an authentication image having further RGB colors;
 Converting color values of the authentication image from RGB color space to a secondary color space having at least four primary colors and determining a number of respectively colored pixels for each primary color of the secondary color space;
 Generating a one-time verification number by converting the determined number of respectively colored pixels for each primary color of the secondary color space to hexadecimal numerals.

Embodiment 18: The method according to the preceding embodiment, wherein the transaction of the crypto currency unit comprises printing the crypto currency unit, wherein the printing of the crypto currency unit comprises printing the authentication image on a substrate and printing the hexadecimal numeral of the one-time verification number on the same substrate.

Embodiment 19: Crypto currency, wherein each crypto currency unit is generated by performing the following steps:
 Generating a digital RGB image having RGB colors by scanning a physical object;
 Combining first transaction data and the digital RGB image, thereby generating an intermediate RGB image;
 Combining identity information and the intermediate RGB image, thereby generating an authentication image having further RGB colors;
 Converting color values of the authentication image from RGB color space to a secondary color space having at least four primary colors and determining a number of respectively colored pixels for each primary color of the secondary color space;
 Generating a one-time verification number by converting the determined number of respectively colored pixels for each primary color of the secondary color space to hexadecimal numerals.

Embodiment 20: Cryptocurrency according to the preceding embodiment, wherein the generating of the crypto currency unit comprises printing the crypto currency unit, wherein the printing of the crypto currency unit comprises printing the authentication image on a substrate, and printing the hexadecimal numeral of the one-time verification number on the same substrate.

Embodiment 21: Use of a blockchain according to embodiment 16, for a purpose of use, of trading crypto currency such as the crypto currency according to embodiment 19.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

Figure 1B:
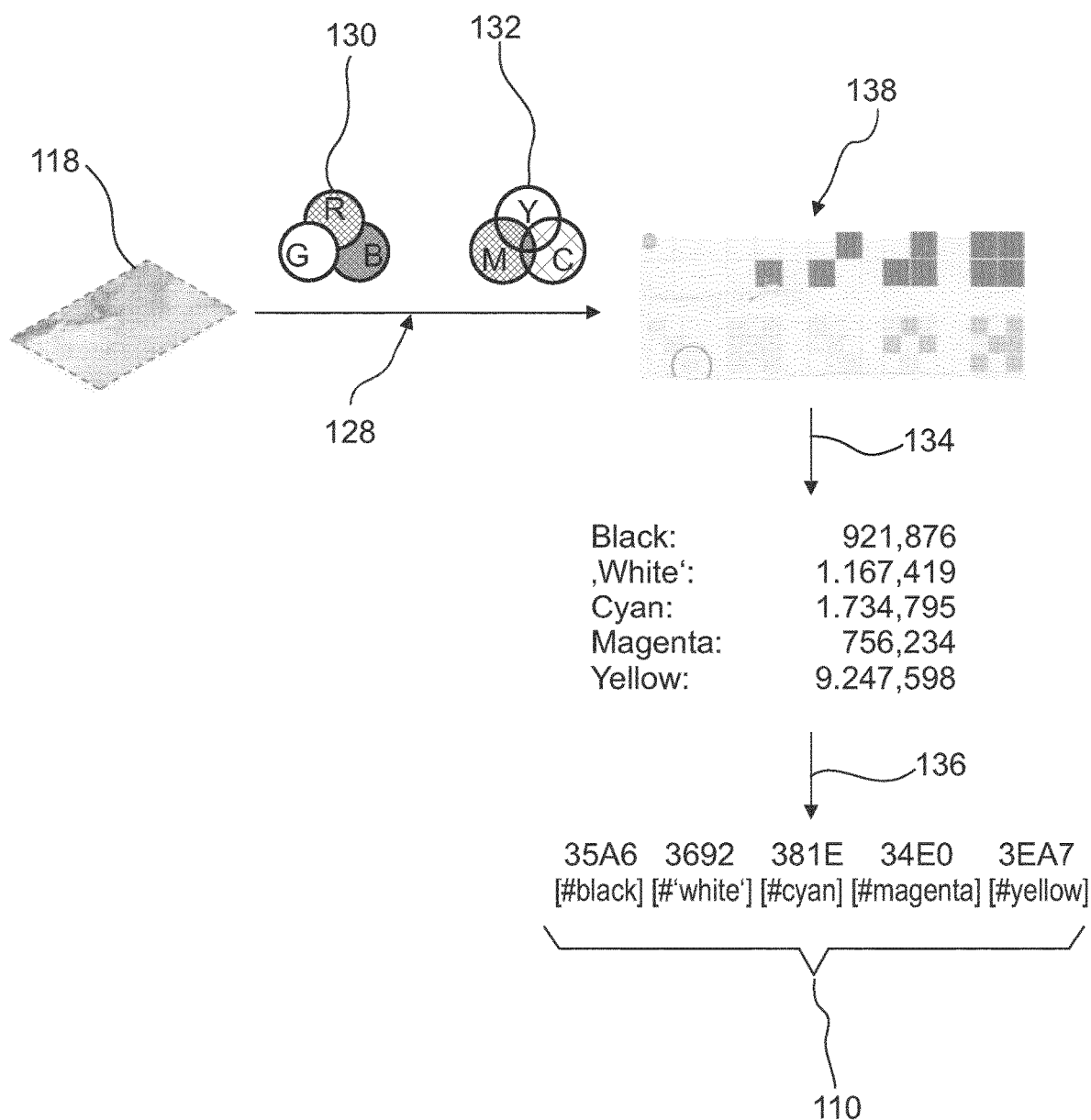
Figure 2:
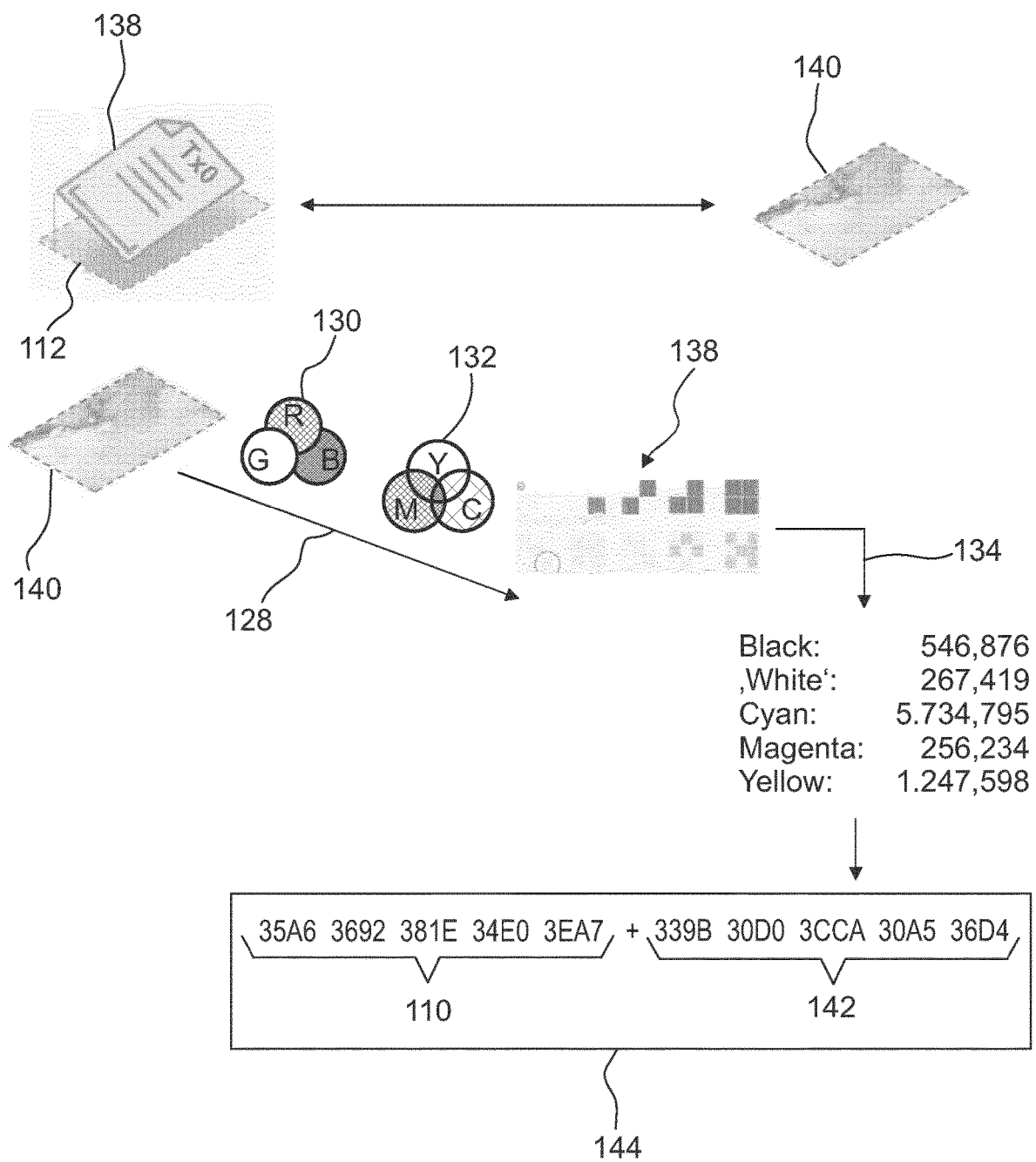
Figure 3:
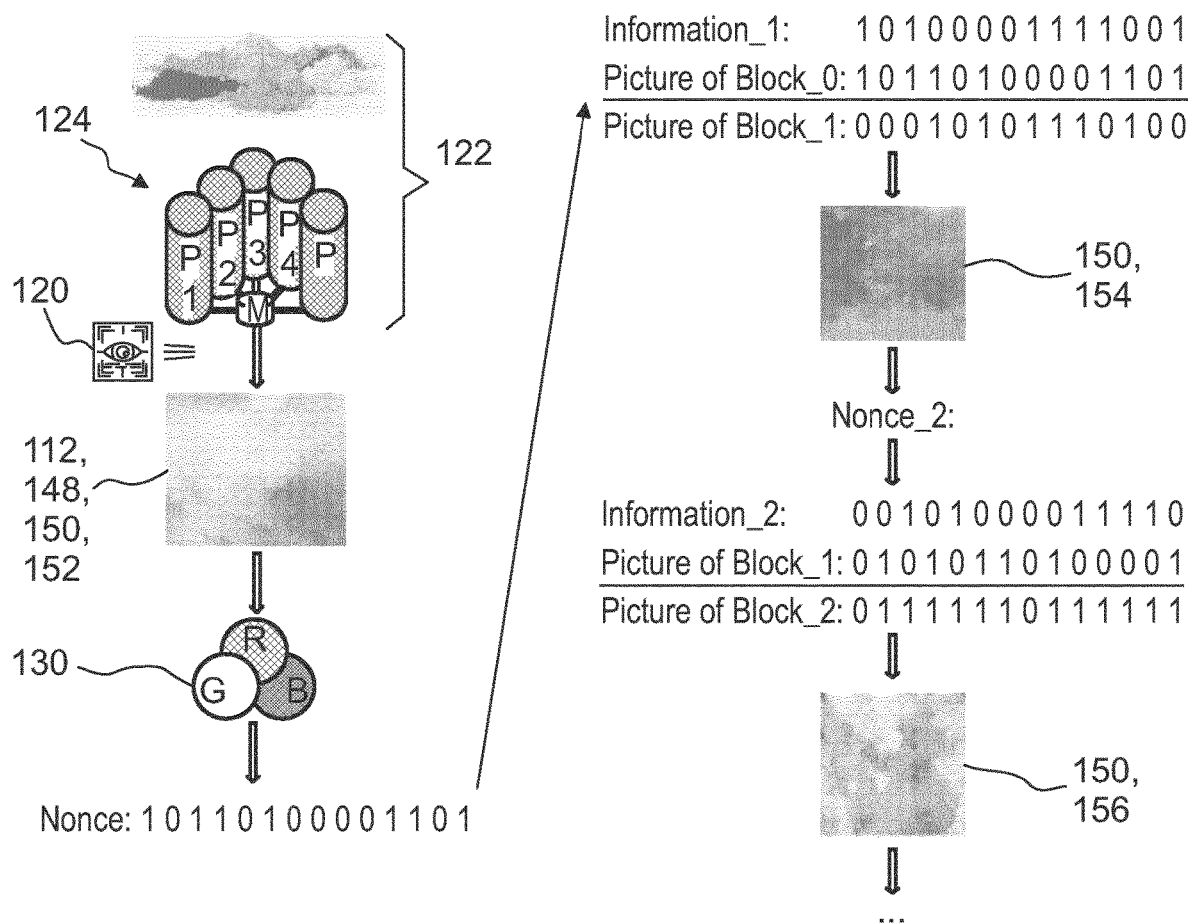
Figure 4:
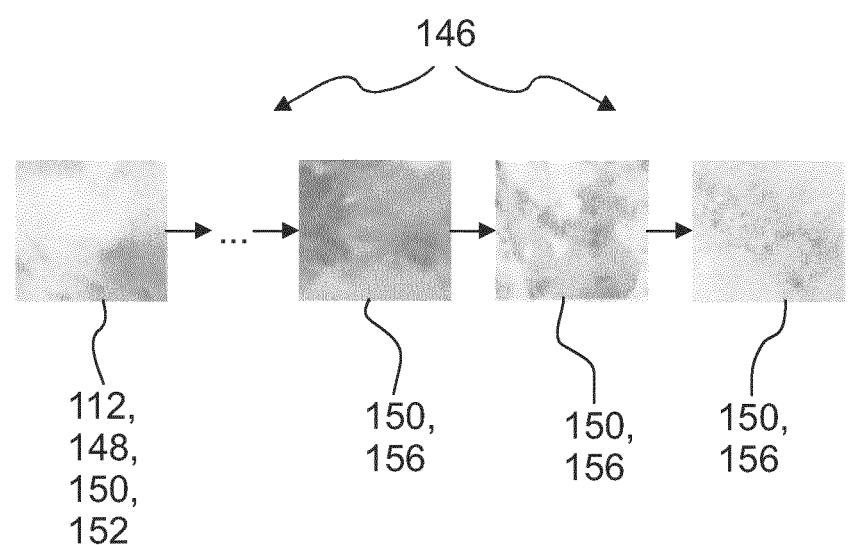
Figure 5:
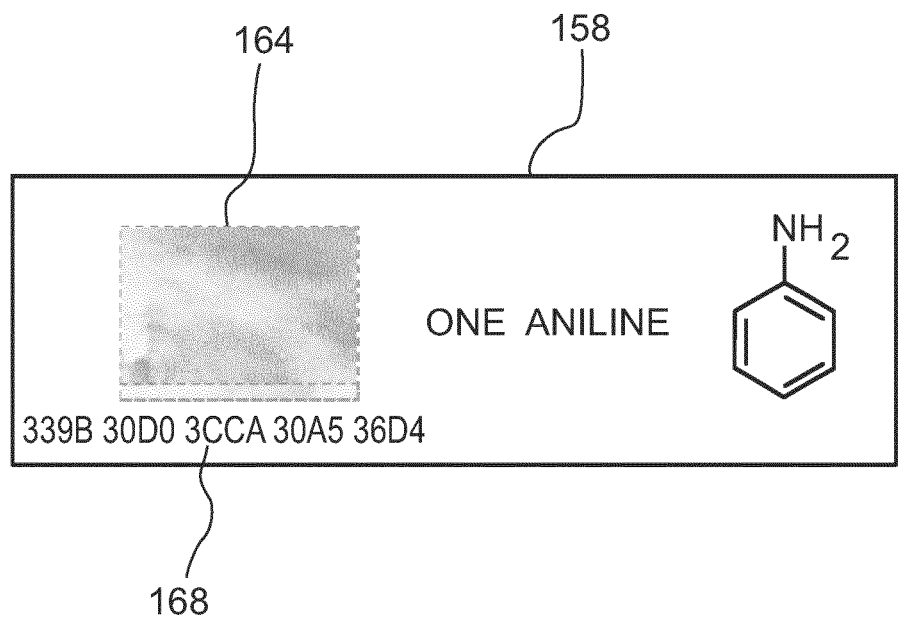
Figure 6:
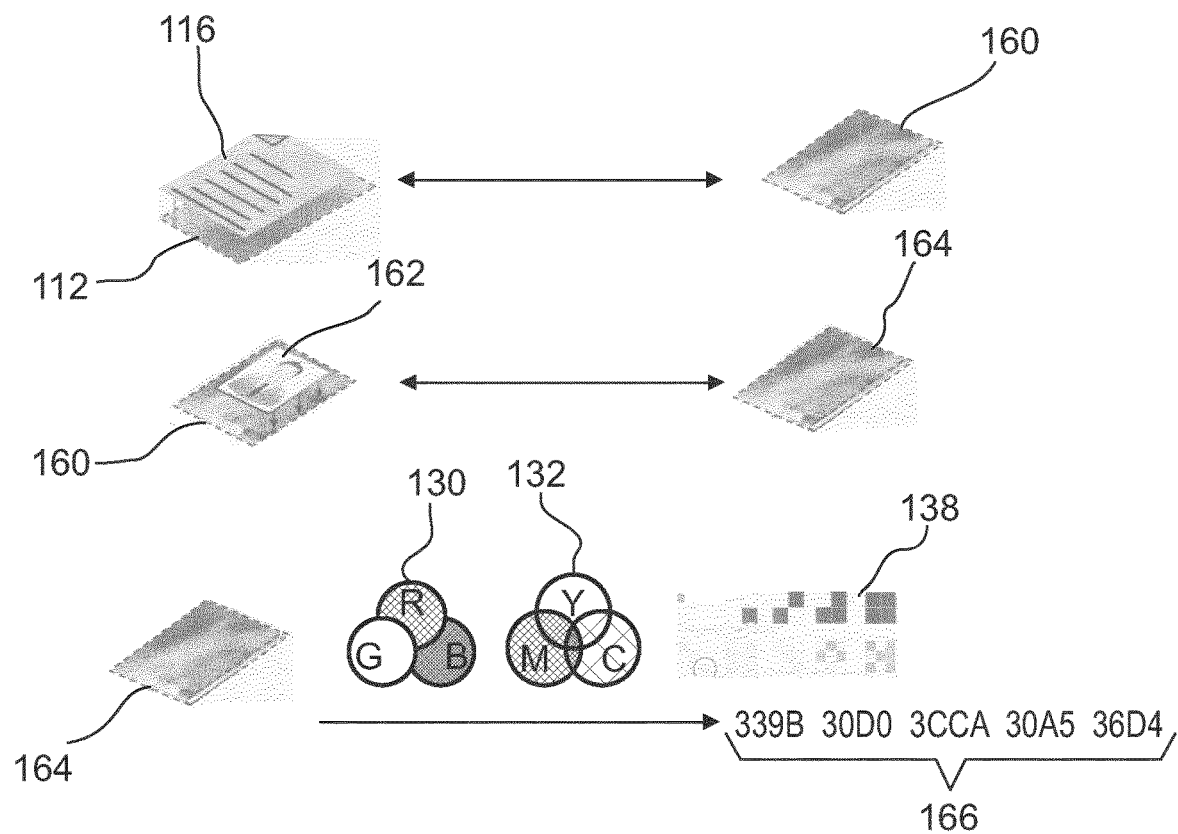

In the Figures:
 FIGS. 1A and 1B show an embodiment of a method for generating a hash value;
 FIG. 2 shows an embodiment of a method for generating a root-hash;
 FIG. 3 shows an embodiment of a method for generating a nonce and a blockchain;
 FIG. 4 shows an embodiment of a blockchain;
 FIG. 5 shows an embodiment of a crypto currency unit; and
 FIG. 6 shows an embodiment of a method for generating a crypto currency unit.

DETAILED DESCRIPTION OF THE EMBODIMENTS

In FIGS. 1A and 1B a schematic illustration of an embodiment of a computer implemented method for generating a hash value 110 is shown. Generally, a hash value 110 may be generated using a hash function. A hash functions may be an arbitrary function that can be used to map data of arbitrary size to fixed-size values. The values returned by a hash function are called hash values. The hash value 110 is a numeric value of a fixed length which uniquely representing data.

As shown in FIG. 1A, the method comprises the following steps:
 i) Providing a first digital RGB image 112 having first RGB colors of a physical object 114;
 ii) Combining first transaction data 116 and the first digital RGB image 112, thereby generating a second RGB image 118 having second RGB colors.

A digital image may be a two-dimensional representation of the physical object 114. A digital RGB image may be a color digital image having three color channels, i.e. one for red (R), one for green (G) and one blue (B). The primary colors of the digital RGB image may be red, green and blue. The RGB digital image may have a color channel for each primary color. The digital color image may comprise a plurality of image pixels, wherein each image pixel is made of combinations of the primary colors. For example, the digital RGB image may be 24-bit or 48-bit. Each pixel of the digital RGB image may be specified by two spatial coordinates and three color values.

The providing the first digital RGB image 112 may comprise generating the first digital image 112 or retrieving the first digital RGB image 112 of the physical object 114 from a database such as from physical objects 114 like paintings, buildings, plants and the like.

Preferably, the first digital RGB image 112 may be generated by digital scanning 120 of the physical object 114. The physical object 114 may be an arbitrary physical object. For example, the physical object 114 may be a blend, a painting, a building, a plant and the like.

Specifically, the providing of the first digital RGB image 112 may comprise mixing 122 pigments and scanning 120 the mixed pigments. The method may comprise blending at least two materials according to at least one item of blending information by using a blending device 124, thereby generating at least one blend.

The material may be a chemical element or a chemical compound, specifically a chemical element or a chemical compound being capable of mixing with other chemical elements or chemical compounds. The material specifically may be suitable for pouring. The material generally may be in one or more of a solid state, specifically a granular solid state, a liquid state or a gaseous state. Specifically, the material may be or may comprise at least one of a powder or a liquid. The material may be a homogeneous, unitary material. Alternatively, the material may also comprise a plurality of components which are mixed homogeneously or inhomogeneously. Thus, the material may be a mixture or a composite by itself. As an example, the material may be or may comprise a liquid, wherein the liquid, as an example, comprise at least one solvent and at least one chemical compound dissolved, emulsified or dispersed in the at least one solvent. The solvent may form part of the material, or, alternatively, the at least one chemical compound may be considered the material, whereas the solvent may simply be considered as an adjuvant or additive to the material.

The blending may comprise the process of mixing 122 the at least two materials in a defined manner, thereby creating a blend. The mixing 122 take place in various ways, in accordance with the nature of the at least two materials. As an example, in case the at least two materials comprise powders, the mixing 122 may involve co-dispensing or subsequently dispensing the powders into a common receptacle, including the option of stirring the mixture. Additionally or alternatively, in case the at least two materials comprise liquids, the mixing 122 may also involve co-dispensing or subsequently dispensing the liquids into a common receptacle, including the option of stirring the mixture. Additionally or alternatively, the mixing 122 may also comprise printing processes, e.g. inkjet printing of the at least two materials, e.g. onto a common substrate. Additionally or alternatively, the blending may comprise other types of mixing processes 122 of the at least two materials, such as mixing 122 the at least two materials on at least one common substrate. As an example, the blending may comprise one or more electrostatic precipitation processes, such as electrostatic precipitation of the at least two materials, e.g. onto a common substrate, e.g. onto an electrostatic charged surface. Thus, specifically, the blending and/or mixing 122 may comprise electrostatic precipitation in printing processes. For example, the blending and/or mixing 122 may comprise electrostatic precipitation in printing processes of at least two electrostatic charged materials onto an electrostatic neutralized surface. Thus, the materials may be mixed, thereby at least temporarily changing their electrical charges. Specifically, the blending and/or mixing may comprise electrostatic precipitation in laser printing processes, such as processes typically performed in a laser printer. In particular, the at least two materials, e.g. the pigments, may for example firstly be electrostatically charged and deposited on an equally charged image roll where specific areas have been electrostatically neutralized, e.g. by using a laser and/or LED. These deposited materials may, as an example, then be drawn and/or removed off the image roll by a reversely charged substrate, such as by a reversely charged paper.

The blending may leave the materials unchanged or may also fully or partially change the nature of the materials. Thus, as an example, the materials may simply be mixed 122 without any chemical changes. Additionally or alternatively, the materials may be mixed 122, thereby changing their chemical nature. The latter specifically may take place in case the materials contain solvents which, during the blending or afterwards, may fully or partially evaporate. Again, additionally or alternatively, the materials may also fully or partially react with each other, thereby generating at least one reaction product.

The blend may be a mixture of the at least two materials. The mixture specifically may be present in at least one receptacle and/or on at least one substrate. The mixture generally may be in one or more of a solid state, specifically a granular solid state, a liquid state or a gaseous state. Specifically, the mixture may be or may comprise at least one of a powder or a liquid. The mixture may be in the same state as the materials or may be in a different state. As an example, at least one of the materials may be in a liquid state, wherein the mixture may also be in a solid state, which may be the case e.g. after a drying process. Thus, as an example, the at least two materials may be mixed in the blending process in a liquid state, wherein, afterwards, a drying may take place, thereby evaporating at least one solvent and/or thereby changing the chemical nature of the mixed materials. As an example, the mixing process may imply a printing of the at least two materials in a liquid state onto at least one substrate, followed by a drying or setting process, wherein the blend, consequently, may be in a dried or solid state. Other examples may imply a phase change process, such as a curing or a solidifying of the materials after mixture.

The item of blending information may be at least one item of information describing a defined blending process. The at least one item of blending information may refer to the process of blending itself, such as to the way the at least two materials are mixed, e.g. to process parameters of the mixing process 122. Additionally or alternatively, the at least one item of blending information may also refer to the materials for blending, such as to quantities to be mixed in the blending process, e.g. to masses or volumes of the materials.

The blending device 124 may be configured for performing the above described blending process. Specifically, as will also be outlined in further detail below, the blending device 124 may comprise at least one of a feed or a reservoir for each of the materials. The blending device 124 may also comprise at least one blending element, such as at least one of a nozzle, a stirring device, a printer, a mixer or the like.

The blend may be a mixture of at least two materials. The blend specifically may be present on a substrate or in a receptacle. The blend specifically may comprise a finite amount of the materials.

The providing of the first digital RGB image 112 may comprise detecting at least one material property of the blend by using at least one detector, not shown here. The material property may be an arbitrary property of a material, such as of the blend. The property specifically may refer to one or more of a physical, a chemical or a biological property. Specifically, the material property may comprise at least one of a mechanical property or an optical property of the material. The material property specifically may refer to a measurable property of the respective material. More specifically, the at least one material property may be or may comprise at least one color of the blend. Additionally or alternatively the at least one property selected from the group consisting of: a specific density of the blend; a volume of the blend; a weight of the blend; an optical property of the blend; a spectral composition of the blend, specifically a color spectrum of the blend; a color intensity of the blend; a viscosity of the blend. Other material properties may be used alternatively or additionally.

The step of detecting the at least one material property of the blend specifically may comprise generating at least one item of measurement information on the material property. Thus, the at least one item of measurement information may generally refer to the result of a measurement of the at least one material property, such as to at least one numerical measurement value indicating the at least one material property of the blend or being characteristic for the at least one material property of the blend. Thus, as an example, the at least one item of measurement information may, as an example, comprise at least one of the following items of information: a specific density measurement value of the blend; a volume measurement value of the blend; a weight measurement value of the blend; an optical property measurement value of the blend; a color measurement value of the blend; a spectral composition measurement value of the blend, specifically a color spectrum measurement value of the blend; a color intensity measurement value of the blend; a viscosity measurement value of the blend. These measurement values might as an example each may be or may comprise a single number or a plurality of numbers, such as distributions, spectra or the like. Specifically, the at least one item of measurement information may be or may comprise at least one numerical value such as a digital value.

The detecting may comprise generating information on a property or measurable variable, wherein qualitative and/or quantitative information may be retrieved. The detection specifically may comprise measuring at least one measurable variable of the physical object 114. The detector may be configured for performing the detecting process. The detector may have at least one sensor for measuring the at least one measurable variable of the object 114. As an example, the sensor may comprise one or more of: a weight sensor, specifically a scale; a volume sensor; a density sensor; a color sensor; a particle size distribution sensor. Other sensors may be used in addition or alternatively.

The at least one item of blending information specifically may comprise n blending variables, wherein n denotes a positive integer. The blending variable may be a variable which either quantitatively or qualitatively describes at least one aspect or parameter of the blending. As an example, the blending variable may refer to the at least two materials, to detect of the blending process such as quantities or material streams for mixture or the like. Further, m material properties of the blend may be detected, with m being a positive integer. Specifically, the number m of material properties detected may be as large or larger than the number n of blending variables. In other words, preferably, m≥n. In still other words, specifically, the information generated by the detection may be at least as large as the information used for the generating of the blend, wherein the information may be the numbers n and m, respectively, and/or may be the number of degrees of freedom and/or the logarithm of the degrees of freedom, such as log n or log m, respectively.

The at least two materials blended specifically may be different materials, specifically materials being different with respect to at least one property selected from the group consisting of: a chemical property, specifically a chemical composition; an optical property, specifically an optical appearance such as one or more of a color, a transparency, a brilliance; a mechanical property, specifically one or more of granularity, particle size, density, viscosity or flowing properties; an electrostatic chargeability; a compressibility; a crystallinity; a particle shape. Still, additionally or alternatively, other properties may be used.

The at least two materials specifically may comprise bulk materials and/or loose materials. The at least two materials, independently, each may be selected from the group consisting of solid materials, gaseous materials and liquid materials. More specifically, the at least two materials, independently, may be selected from the group consisting of and/or may comprise at least two materials selected from the group consisting of:
  a powder, specifically a powder selected from the group consisting of:
    an inorganic powder, specifically an inorganic powder made of a mineral;
    an organic powder, specifically an organic powder made of a polymer;
    a pigment;
  a liquid, specifically a liquid selected from the group consisting of a pure liquid, a suspension, an emulsion or a solution, more specifically one or more of a liquid color and an ink.

The blending of the at least two materials may be performed according to at least one item of blending information. The at least one item of blending information specifically may comprise at least one of: quantities for the at least two materials to be blended; weights for the at least two materials to be blended; volumes of the at least two materials to be blended; a blending ratio of volumes of the at least two materials to be blended; a blending ratio of weights of the at least two materials to be blended; mixing instructions for mixing two or more continuous or discontinuous streams of the at least two materials to be blended; printing instructions for blending the at least two materials to be blended, such as a tilting information for blending the at least two materials to be blended using differently tilted raster images, e.g. raster images generated by a raster image processor (RIP) of a printer. Still, additionally or alternatively, other types of blending information may also be used.

The at least two materials may be fed into the blending device 124 continuously or discontinuously. Thus, as an example, the blending device 124 may comprise at least two reservoirs for the at least two materials to be blended. Additionally or alternatively, however, other means of feeding the materials into the at least one blending device 124 are also possible. Thus, as an example, a continuous feeding is also possible, in addition or alternatively to using at least one reservoir for at least one of the materials.

The blending device 124 may further comprise at least one receiving element for receiving the blend, not shown here. The receiving element may be an arbitrary element configured for receiving the blend. The receiving element specifically may have at least one receiving surface and/or at least one receiving material for receiving the blend. Thus, as an example, the at least one receiving element specifically may comprise at least one element selected from the group consisting of: a receiving vessel for receiving the blend; a substrate for receiving the blend. The at least one receiving element may be a stationary receiving element and/or maybe a moving receiving element, such as a rotatable receiving element. As an example, the receiving element may comprise at least one substrate, such as a substrate having at least one substrate surface which may be or may comprise a planar substrate surface and/or which may be or may comprise a curved substrate surface. As an example, the receiving element may comprise at least one drum having a receiving surface for receiving the blend, such as a rotating drum. The blend, by using the blending device, specifically may be deposited directly or indirectly on to the rotating drum. As an example, a drum may be used on which the blend is temporarily secured, such as electrostatically. These electrostatic drums are generally known in the technical field of printing, such as laser printing.

In case the receiving element comprises at least one drum, the drum specifically may be a rotating drum. Therein, the method may further comprise at least one cleaning step in which, after detecting the at least one material property, the blend specifically may be removed from the receiving surface of the drum. As an example, powders and/or pigments may be dispensed onto a rotating drum and may be, as an example, temporarily secured to the surface of the rotating drum by electrostatic forces. During that time of securing the blend to the surface of the rotating drum, the at least one material property of the blend on the surface might be detected, e.g. by optical reading. As an example and as will be outlined in further detail below, colors may be detected and, subsequently, may, as an example, be transformed into binary information, such as a binary row of numbers. Subsequently, the drum may be cleaned, such as by rotating into a cleaning position, e.g. by rotating the drum by 90°.

A similar procedure, optionally without the securing by electrostatic forces, may also be performed by using inkjet printing, either directly onto the surface of a drum and/or onto a moving substrate, such as onto a paper substrate. The drum, after detecting the at least one property, may be cleaned for reuse. Thus, as an example, the blending device may comprise at least one inkjet printer. The materials may be or may comprise inkjet printing of the materials, which may be or may comprise liquid materials, onto the at least one receiving element, such as onto the at least one rotating drum and/or onto at least one substrate. Subsequently, the detection of the at least one material property may take place, such as of the at least one optical property, e.g. by optical reading. As an example, again, colors may be detected and, subsequently, may, as an example, be transformed into binary information, such as a binary row of numbers. Subsequently, the drum may be cleaned, such as by rotating into a cleaning position, e.g. by rotating the drum by 90°. Additionally or alternatively, besides cleaning the at least one receiving element, a new receiving element or a new part of the receiving element may be used for further steps, such as for further printing and for repeating the blending and the detecting.

The blending device 124 specifically may comprise at least one blending element for generating the blend, not shown here. The blending element may comprise an arbitrary element, device or combination of elements configured for blending the at least two materials, specifically by mixing 122 the at least two materials, e.g. before, during or after deposition onto the at least one optional receiving element. As an example, the at least one blending element may be or may comprise at least one element selected from the group consisting of: a dispenser for continuously or discontinuously dispensing at least one of the two materials; a printer for printing the at least two materials onto at least one receiving element, specifically onto at least one substrate, specifically at least one printer selected from the group consisting of: an inkjet printer, a laser printer. Still, additionally or alternatively, other types of blending elements may be used. Thus, as an example, the blending element may be or may comprise at least one of a stirring element, a dispenser, a nozzle, an extruder.

The blending device 124 may be or may comprise at least one printer, not shown here. The printer is configured for receiving the at least one item of blending information and for mixing the blend. The printer may be configured for applying, e.g. printing, at least one material onto at least one printing surface or substrate, specifically in a patterned fashion, according to at least one printer control information. Thus, typically, the printer may be configured for generating text and/or images on the at least one printing surface according to the at least one printer control information, such as one or more of a string of characters, a bitmapped image, a vector image, a computer program, e.g. provided in at least one printer control language. In particular, the printer, specifically at least one function of the printer, may be controllable via at least one printer control language, such as one or more page description languages (PDLs), printer command languages (PCLs), PostScript, XML Paper Specification and the like.

In particular, the printer may comprise one or more of a drum, such as an image drum; a laser, a lens system, such as a lens system comprising at least one mirror, e.g. a rotatable mirror; a cleaning element, such as a roll, a scraper or similar means for cleaning, e.g. for cleaning the drum; a cassette, e.g. for storing one or more of the substrate, such as a paper cassette; at least one transporting element, such as a roller and/or conveyor, e.g. for feeding, transferring and/or ejecting the substrate, specifically the paper, into, within and/or from the printer; a printer control unit configured for controlling the printer.

The printer may specifically be configured for blending the at least two materials according to the at least one item of blending information onto at least one substrate. In particular, the printer may be configured for blending the at least two materials according to the item of blending information, thereby e.g. generating the blend, onto a substrate for receiving the blend. The substrate may specifically be or may comprise at least one carrier medium, such as a carrier medium selected from the group consisting of: a glass carrier, such as a glass plate or a glass sheet; a plastic carrier, such as a plastic plate or a plastic sheet; a paper carrier, such as a paper sheet; a canvas. Other substrates may be feasible. As an example, the substrate may be a part of the printer itself or may be embedded within the printer. In particular, the substrate comprised by the printer may be a reusable carrier medium, such as a medium having a cleanable surface, e.g. a drum of the printer, for example a rotating drum.

The printer may further be configured for blending the at least two materials such that at least one pattern, specifically at least one interference pattern, is generated. The at least two materials to be blended by the printer may in particular be different materials, specifically materials being different with respect to at least one property. As an example, the at least two materials to be blended by the printer may differ in at least one property selected from the group consisting of: a chemical property, specifically a chemical composition; an optical property, specifically an optical appearance such as one or more of a color, a transparency, a brilliance; a mechanical property, specifically one or more of granularity, particle size, density, viscosity or flowing properties; an electrostatic chargeability; a compressibility; a crystallinity; a particle shape.

The method may comprise transforming the detected material property into RGB values for generating the first digital RGB image 112. The transforming may be performed by using at least one data processing device configured for applying at least one transformation algorithm to the material property. The transforming of the at least one material property into RGB values may take place in a computer-implemented fashion. Thus, the transforming of the at least one material property into the RGB values takes place by using at least one data processing device configured for applying the at least one transformation algorithm to the material property. The algorithm may comprise a plurality of process steps to be performed subsequently and/or in parallel. The algorithm specifically may comprise one or more mathematical operations to be applied to at least one input variable. The transformation algorithm may be an algorithm which performs a transforming process for transforming the material property into RGB values by using one or more mathematical operations to be applied to the at least one input variable. The transformation of the material property into RGB values may take place in a single step or in a plurality of steps.

The transforming of the material property into RGB values may comprise subjecting the at least one material property to at least one test, specifically to at least one predetermined test. The at least one test may be or may comprise comparing the at least one material property directly or indirectly, such as by using the at least one item of measurement information, with at least one comparison value, at least one comparison value range or the like. Other mathematical tests are generally feasible and may also be applied. In accordance with the result of the at least one test, the RGB values may be generated. The transforming of the material property into RGB values specifically may comprise comparing the at least one material property, including the option of using the at least one item of measurement information representing the material property, with at least one threshold value. In accordance with the result of this comparison, for each primary color at least one number may be assigned to the material property.

Preferably, the first digital RGB image 112 may be generated by scanning 120, in particular digital scanning, the blend, or at least a region of interest of the blend. The digital scanning may be performed using the at least one scanning device. The scanning device may be configured for detecting at least one property of at least one object and/or element, e.g. of the blend. In particular, the scanning device may be configured for examining and/or detecting at least one material property of the blend. As an example, the scanning device may have at least one scanning element configured for optically recording and/or capturing spatially resolved one-dimensional, two-dimensional or even three-dimensional optical information on the blend. Thus, e.g. for optical detection, the scanning device may, for example, comprise at least one sensor, such as optical sensors, specifically image sensors, e.g. at least one light sensitive capacitor, at least one charge-coupled device (CCD). The scanning device may for example comprise at least one CCD-chip and/or at least one CMOS chip. Specifically, the scanning device may be configured for detecting optical signals of the blend, e.g. of the blended and/or merged powder components, such as by using an optical system. In particular, the scanning system may be configured for convert, e.g. break down, the optical signals of the blend into primary colors, such as into red, green and blue, e.g. by using a prism. The scanning device may specifically be configured for converting the optical signals, such as the optical signals converted into primary colors, into at least one digital image, e.g. by using at least one sensor, such as a sensor comprising a plurality of light-sensitive capacitors. Further, the scanning device may comprise at least one illuminating element, such as an element configured for illuminating the blend, wherein the scanning device may be configured for detecting the at least one property of the blend by using a reflection of the blend. Herein, the scanning device may also be referred to as scanner. The scanning device may specifically be or may comprise a device selected from the group consisting of: a CCD scanner; a CIS scanner; a camera; a film. In particular, the scanning device may comprise at least one optical detection system, specifically comprising one or more of an optical detector, an image sensor, for example a photomultiplier tube (PMT), e.g. a vacuum tube converting incident photons into an electric signal, a silicon photomultiplier (SiPM), e.g. a solid-state device converting incident photons into an electric signal. The scanning device may specifically comprise at least one processor, wherein the processor may be configured for controlling at least one scanning operation of the scanning device.

Step i) may comprise generating a digital image element 126 by sizing the first digital RGB image 112 to a predefined size. The size of digital image element 126 may be larger than a size of the first transaction data 116. The digital image element 126 may be a section or cutout of the first digital RGB image. The sizing may comprise adapting and/or selecting and/or reducing and/or cutting the full first digital RGB image 112 to a digital image element 126 comprising a region of interest.

The transaction may comprise financial transactions such as payments, licensing, orders, invoices, and/or logistic transactions such as deliveries, storage records, travel records, and/or transactions relating to plans, and/or tax declarations, and/or contracts, and/or personal health information and the like. The transaction data 116 may be data describing at least one transaction. The transaction data 116 may comprise information about one or more of time of transaction, a numerical value of the transaction, a text of the transaction, a digital image of the transaction and the like. The transaction data may be provided in binary format.

The process of combining the first transaction data 116 and the first digital RGB image 112 may comprise adding and/or mapping the data to the pixel information of the first digital RGB image 112. Specifically, the combining of the first transaction data 116 and the first digital RGB image 112 may comprise adding a binary code of the first transaction data 116 to a binary code of the first digital RGB image 112. In particular, step ii) comprises determining the binary code of the first digital RGB image 112 and adding the binary code of the first transaction data 116 to the binary code of the first digital RGB image 112. The combining may comprise mapping the transaction data with the digital image element. Vectors for position of colors are not changed.

The combining may be performed as follows. Color values of each pixel of the first digital RGB image 112 may be converted into hexadecimal numerals. For example, the conversion of the color values into hexadecimal numerals may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The hexadecimal numerals may be further converted into the binary code of the first digital RGB image 112, for example, by using at least one mathematical algorithm and/or at least one pre-determined relationship such as a look-up table, e.g. as described in ""Improving Image Performance by Using Color Lookup Tables, Adobe developer support, Technical Note #5121, 31 Mar. 1992 or https://www.rgbtohex.net/hextorgb/.

The binary code of the first digital RGB image 112 and the first transaction data 116 may be added. In FIG. 1A exemplary binary codes of the first digital RGB image 112 and the first transaction data 116 are shown and in addition the result of adding the binary codes is shown. The added binary codes may be converted into hexadecimal numbers which may be converted into color values. For example, the conversion of hexadecimal numerals into the color values may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The second RGB image 118 may be generated by using the determined color values for the corresponding image pixels. The second RGB image 118 may be a second digital RGB image. The second RGB image 118 may differ from the first digital RGB image 112. In particular, the pixels of the first digital RGB image 112 and the second RGB image 118 have different color values.

As shown in FIG. 1B, the method for generating a hash value 110 further comprises the following steps:
iii) Converting 128 color values of the second RGB image 118 from RGB color space 130 to a secondary color space 132 having at least four primary colors and determining 134 a number of respectively colored pixels for each primary color of the secondary color space 132;
iv) Generating 136 the hash value 110 by converting the determined number of respectively colored pixels for each primary color of the secondary color space 132 to hexadecimal numerals.

The second RGB image 118 may be digitally converted 128 from RGB colors to the secondary color space 132. The secondary color space 132 may be an arbitrary color space having a suitable number of primary colors, i.e. at least four primary colors. Preferably, the secondary color space 132 is the CMYK color space, wherein the primary colors of the secondary color space are black, cyan, magenta, yellow and white, whereby white is meant as no color on a white substrate. The conversion 128 from the RGB color space 130 to the secondary color space 132 may be performed for each pixel of the second RGB image 118. The conversion 128 from the RGB color space 130 to the secondary color space 132 may be performed using at least one mathematical algorithm and/or at least one pre-determined relationship such as a look-up table, e.g. as described for the conversion of the RGB color space into CMYK color space in U.S. Pat. No. 5,283,671 A, or in "Schule der Farben—Grundzüge der Farbentheorie für Computeranwender and andere", Küppers, Harald, DuMont Buchverlag, Köln 2. Edition, ISBN 978-3-7701-2841-9, pages 125-134 or www.farbtabelle.at/farben-umrechnen. The conversion 128 from the RGB color space 130 may be performed using at least one software, in particular a software of the printer for converting the RGB colors.

The converted image may be further transformed into a pattern 138. The pattern 138 may be a grid. The pattern 138 may comprise at least one matrix comprising rows and columns indicating the presence or absence of primary colors of the respective pixel. The further transformation, in particular rastering, may be performed by the printer software. Next, the colored dots may be counted. The determining 134 of the number of respectively colored pixels for each primary color of the secondary color space may comprise counting colored dots of the converted and rastered image, in particular of the matrices. FIG. 1B shows an example of counted dots. In this example 921876 black dots, 1167419 white dots, 1734795 cyan dots, 756234 magenta dots and 9247598 yellow dots were counted. The determined number of pixels of each primary color may be converted 136 to hexadecimal numerals. Specifically, the color dot numbers are transferred to hexadecimal numerals. The conversion 136 of the determined number into hexadecimal numerals into the color values may be performed using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/.

The generating of the hash value 110 may comprises converting the determined number of respectively colored pixels for each primary color of the secondary color space 132 via a predefined formula to fixed-size hexadecimal values. Specifically, the determined number of pixels of each primary color may be converted to a fixed-size value without decimal digits. The predefined formula may be a logarithmic formula. The information of the counted dots may be transferred into hexadecimal numerals via a logarithmic formula to fixed-size values—which is necessary for hashing any transaction. The pre-defined mathematical formula for converting the determined number of respectively colored pixels for each primary color of the secondary color space to fixed-size hexadecimal values may be "a+b*x+c* (x/16)+d*1000*In(x+1), wherein "x" is the number of pixels of each primary color and a, b, c and d are parameters. For example, for generating 4-digit hexadecimal numerals, the value of "a" may be 4,096 for all of the following cases: In case of the sum of all pixels of each primary color is smaller than 60,000, "b" is 1, "c" and "d" are 0; in case of the sum of all pixels of each primary color is between 60,000 and 950,000, "c" is 1, "b" and "d" are 0. In case of the sum of all pixels of each primary color is larger than 950,000, "d" is 1, "b" and "c" are 0. Thereby, the result from the calculation by the predefined formula may be rounded down to full hexadecimal numerals." For example, for generating hash values of other fixed-size than 4-digit hexadecimal numerals, e.g. 3-digit or 10-digit, "a", "b", "c" and "d" may be adjusted accordingly.

As the method is about the depiction of 2-dimensional information, i.e. the digital image, to a one-dimensional value, the hexadecimal number, this method is fulfilling the requirements of a cryptographic hash function. Due to the large amount of color information, the risk of hash collusion should be very low. Specifically, by generating the hash value by using a first digital RGB image of locally generated blend of mixed pigments and thus, of billions of particles, tracing of hash generation is not possible. Moreover, the hash value is extremely secure because of the high amount of possible colors of each of the pixel and of the image. The amount of possible colors may depend on the image size and of the resolution of the scanner. Thus, the amount of possible color may even increase in the future in view of increasing camera resolution.

FIG. 2B shows an embodiment of a computer implemented method for generating a root-hash. The method may comprise generating a hash tree, also denoted Merkle tree. Generally, as outlined in en.wikipedia.org/wiki/Merkle_tree, a hash tree has leaves which are hashes. The hash tree may have a plurality of hashes. The root-hash may be top of a hash tree, also denoted master hash.

The method comprises determining a first hash 110 value by using the method according to the present invention for generating a hash value as described with respect to FIGS. 1A and 1B.

The generating of the root-hash comprises the following steps:
  a) Combining second transaction data 139 and the first digital RGB image, thereby generating a third RGB image 140 having third RGB colors;
  b) Converting 128 colors values of the third RGB image 140 from RGB color space 130 to the secondary color space 132 and determining 134 a number of respectively colored pixels for each primary color of the secondary color space 132;
  c) Generating 136 a further hash value 142 by converting the determined number of respectively colored pixels for each primary color of the secondary color space 132 to hexadecimal numerals;
  d) Generating 144 the root hash by aggregation of the first hash value 110 and the further hash value 142.

The combining of the second transaction data 139 and the first digital RGB image 112 may be performed analogous as described with respect to the combination of the first transaction data 116 and the first digital RGB image 112. As the second transaction data 139 is different from the first transaction data 116, the third RGB image 140 has different RGB color values than the second RGB image 118.

The converting 128 of the color values of the third RGB image 140 to the secondary color space 132 may be performed analogous as described with respect to the conversion of the second RGB image to the secondary color space. The generating of the further hash value 142 may be performed analogous as described with respect to the generating of the first hash value 110. As shown in FIG. 2, the counted color dots differ from the counted color dots of FIG. 1B. For the second transaction data 139 in FIG. 2 546876 black dots, 267419 white dots, 5734795 cyan dots, 256234 magenta dots and 1247598 yellow dots were counted.

Thus, in principle, in steps a) to c) the hashing routine of the method according to the present invention for generating a hash value as described with respect to FIGS. 1A and 1B is repeated for the second transaction data 139. As the second transaction data 139 is different from the first transaction data 116, the third RGB image 140 has different RGB color values than the second RGB image 118 such that the resulting further hash value 142 is different from the first hash value.

Step d) comprises generating 144 the root hash by aggregation of the first hash value 110 and the further hash value 142. Techniques for aggregation of the first hash value 110 and the further hash value 142 to a root hash are known by the skilled person. For example, the first hash value 110 and the further hash value 142 may be added up.

The method may be repeated. Specifically, the method may comprise generating further hash values for further transaction data and generating the root hash by aggregation of the hash values.

FIG. 3 shows an embodiment of a method for generating a nonce and for generating a blockchain 146. The nonce may be an arbitrary number that can only be used once (1-dimensional). The method comprises the following steps:
  generating a digital RGB image 148 having RGB colors by scanning a physical object 114;
  generating the nonce by determining a binary code of the digital RGB image 148.

With respect to generating of the digital RGB image 148 reference is made to the description of generating the first RGB image 112 as described in FIG. 1A.

The determining of the binary code of the digital RGB image may comprise converting color values of each pixel of the digital RGB image 148 into hexadecimal numerals. For example, the conversion of the color values into hexadecimal numerals may be performed using at least one mathematical algorithm and/or at least one pre-determined relationship such as a look-up table, e.g. as described in "The Image-Interface: Graphical Supports for Visual Information", Everardo Reyes-Garcia, John Wiley & Sons, 2017, ISBN 978-1-1194-7497-5 or www.farben-umrechnen.de. The hexadecimal numerals may be further converted into the binary code of the digital RGB image 148, for example, by using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/. The nonce may be the code of the RGB colors, but not of image vectors. In FIG. 3 as an example, the following nonce is shown: 10110100001101.

Further in FIG. 3, an embodiment of the method for generating of a blockchain 146 is shown. The method comprises generating a plurality of subsequent linked blocks 150 of the blockchain 146. The blocks 150 may be components or elements of the blockchain 146. The blockchain 146 may comprise a growing list of records, which are called blocks 150, for further details see 2017 IEEE 6th International Congress on Big Data "An Overview of Blockchain Technology: Architecture, Consensus, and Future Trends", Zibin Zheng et al., or "Blockchain: Grundlagen, Anwendungsszenarien and Nutzungspotenziale", Hans-Georg Fill, Andreas Meier, Springer Vieweg, 2020 ISBN 978-3-658-28005-5, pages 3-19 or en.wikipedia.org/wiki/Blockchain. Each block 150 may comprise transaction data. The blocks may be linked by comprising the hash value of the previous block. Each block may comprise a cryptographic hash of the previous block. Each block may further comprise a timestamp.

The method comprises generating a genesis block 152 by generating a first digital RGB image 112, corresponding in this embodiment to the digital RGB image 148, having first RGB colors by scanning the physical object 114. The genesis block may be the first block or block0 of the blockchain 146.

The method comprises generating a subsequent block 154 by determining a binary code of the first digital RGB image 112 and adding the binary code of the first digital image 112 to information to be mapped thereby generating a second RGB image (118) having second RGB colors. This process is repeated for each further block 156 until the blockchain 146 is closed.

As outlined above the method may be repeated. For example, the method may comprise generating a third block, i.e. block 156, by determining a binary code of the second digital RGB image and adding the binary code of the second RGB image to further information to be mapped thereby generating a third digital RGB image having third RGB colors. The blockchain 146 may comprise a plurality blocks such as three, four, five, ten, twenty or more blocks.

The determining of the binary code of the first digital RGB image 112 may comprise converting color values of each pixel of the first digital RGB image 112 into hexadecimal numerals. For example, the conversion of the color values into hexadecimal numerals may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The hexadecimal numerals may be further converted into the binary code of the first digital RGB image 112, for example, by using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/.

The information to be mapped may be or may comprise any kind of information or data to be stored in the block. For example, the information to be mapped comprises one or more of transaction data, a root hash, a nonce, the previous hash value, a timestamp. The method may comprises determining for each generated block a root-hash by using a method for generating a root-hash according to the present invention and adding the root-hash to the block. The method may comprise determining for each generated block a nonce by using a method for generating a nonce according to the present invention and adding the nonce to the block. The method may comprise adding a timestamp of the respective transaction to each of the generated blocks. The method may comprises adding the hash value of the preceding block to each of the generated blocks. The hash value may be determined by using a method for generating a hash value according to the present invention. The information to be mapped may be present in binary format, in particular as a binary code. In FIG. 3, for generating block 154 the information to be mapped may be information_1 and may be given in binary format; in this case 10100001111001. This information is added to the binary code of the first digital RGB image 113, denoted "picture of Block_0" which in this example is 10110100001101 (which is identical to the nonce).

The added binary codes of the first digital RGB image 112 and of the information to be mapped is denoted in FIG. 3 "picture of block_1". The added binary codes of the first digital RGB image 112 and of the information to be mapped may be converted into hexadecimal numbers which may be converted into color values. The conversion of the binary code into hexadecimal numerals may be performed, for example, by using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/. For example, the conversion of hexadecimal numerals into the color values may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The second RGB image may be a second digital RGB image. The second RGB image may differ from the first digital RGB image. In particular, the pixels of the first digital RGB image and the second RGB image have different color values.

For each further set of transactions a next subsequent block 156 may be generated by determining a binary code of the digital image of a preceding block and adding further information to be mapped to the binary code of the digital RGB image of the preceding block, thereby generating a next digital RGB image having further RGB colors. The added binary codes of the digital RGB image of the preceding block and of the further information to be mapped may be converted into hexadecimal numbers which may be converted into color values. The color values may be used for the corresponding pixels of the next digital RGB image, i.e. for the next block.

FIG. 3 shows exemplarily for one subsequent block generating of the nonce from block 154, denoted with "Nonce_2" and addition of exemplary binary codes of further information to be mapped, denoted "Information_2" and binary code of block 154, denoted "Picture of Block_1". The resulting binary code is denoted "Picture of Block_2" which is transformed, as described above in a further RGB image, i.e. block 156.

The method may further comprise encrypting the generated blocks. The encryption may comprise a process of modifying one or more of a message, information or data, by using at least one encryption means, also referred to as an encryption key, such that only authorized parties can access it and those who are not authorized cannot. Specifically, the encryption may comprise a process of modifying one or more of a message, information or data in such a way that only a person being in possession of specific authorization means, also referred to as an encryption key, may transform the modified message, information or data into its original or readable form and, thereby, may retrieve the original message, information or data. The encrypting or encryption process, i.e. the process of modifying the message, information or data specifically may involve an encryption algorithm, by combining the message, information or data with at least one encryption key. As an example, in a binary format, each bit of the message, information or data may be combined with a corresponding bit of the encryption key, thereby generating an encrypted bit. Other encryption algorithms are generally known and may also be used in the context of the present invention.

The encryption key may be an encryption means or decryption means used in an encryption process or in a decryption process, respectively. The encryption key may be an item of information that determines the functional output of a cryptographic algorithm such as an encryption process and/or the decryption process. Encryption keys may also specify transformations in other cryptographic algorithms, such as digital signature schemes and message authentication codes. For the process of encryption and for the process of decryption, identical keys may be used. The present invention may refer to the symmetrical encryption processes. Still, asymmetric encryption processes are also possible.

The encryption key may be generated by transforming the material property of the blending detected by the scanning device into the encryption key by using the at least one data processing device configured for applying at least one transformation algorithm to the material property. The transforming of the at least one material property into the at least one encryption key may take place in a computer-implemented fashion. The transformation of the material property into the encryption key may take place in a single step or in a plurality of steps. The transforming of the material property into the encryption key, as an example, may take place by providing at least one electronic signal, such as digital information, representative for the at least one material property to the at least one data processing device for further processing. Thus, as an example, the detector may directly or indirectly communicate with the data processing device or may even be part of the data processing device. Thus, the at least one material property may directly or indirectly be provided to the data processing device for further processing and four directly or, after preprocessing, applying the at least one transformation algorithm. The result of the transforming process may be the encryption key, wherein the encryption key, as an example, may be provided in an electronic fashion. As an example, the encryption key may be or may comprise electronic information in a digital or analogue format. The encryption key, as an example, may be provided to one or more of a data storage device, and interface, a third-party or the like.

It shall be outlined that the encryption key may be generated in a single step or in a plurality of steps. Thus, the encryption key may also be generated iteratively, e.g. by repeating the steps of blending and detecting and, optionally, transforming, wherein, e.g., in each step of blending and detecting, a part of the encryption key is generated and/or further blending information is generated, for a further blending step. Thereby, complex and large encryption keys may be generated iteratively, even though the number of material properties of a single blend may be limited.

The transforming of the material property into the encryption key, specifically may comprise subjecting the at least one material property to at least one test, specifically to at least one predetermined test. As an example and as will be outlined in further detail below, the at least one test may be or may comprise comparing the at least one material property directly or indirectly, such as by using the at least one item of measurement information, with at least one comparison value, at least one comparison value range or the like. Other mathematical tests are generally feasible and may also be applied. In accordance with the result of the at least one test, the encryption key or at least a part thereof may be generated. The transforming of the material property into the encryption key specifically may comprise comparing the at least one material property, including the option of using the at least one item of measurement information representing the material property, with at least one threshold value. In accordance with the result of this comparison, at least one number may be assigned to the material property. The number specifically may be a binary number. The number may directly form the encryption key or may form part of the encryption key. Thus, as an example, the encryption key may comprise a plurality of its values, wherein at least one of the bit values is assigned in accordance with the result of a comparison of a material property with at least one threshold value. As an example, a spectrum or distribution of at least one material property of the blend may be measured, such as a distribution of colors. In accordance with e.g. the statistical occurrence of a specific color or with the statistical occurrence of another specific feature or property of the blend, a specific bit value may be chosen. Other bit values may be chosen accordingly, e.g. in accordance with other specific features of properties of the blend. Thereby, the full encryption key or at least a part thereof may be generated.

The encryption may be performed using at least one data encryption system, not shown here. The data encryption system may be a device, a combination of devices or a component or combination of components configured for encrypting data. The data encryption system may fully or partially be embodied as a computer or computer system or may be comprised in a computer or computer system. The data encryption system may comprise:

at least one an encryption key generating device according to the present invention, such as according to any one of the embodiments disclosed above or disclosed in further detail below, referring to an encryption key generating device; and at least one encryption device configured for encrypting the data by using the encryption key, thereby generating encrypted data.

The method may further comprise at least one decrypting step, wherein the encrypted block is decrypted. The decryption may be a reverse process of the above-described process of encryption. The decryption may comprise re-modifying encrypted data, by using at least one decryption means, also referred to as an encryption key, such that the encrypted data is transformed into the readable format, i.e. into one or more of the original message, information or data in a readable format. The process of modifying the encrypted data specifically may involve a decryption algorithm, e.g. combining the encrypted data with the at least one encryption key. As an example, in a binary format, each bit of the encrypted data may be combined with a corresponding bit of the encryption key, thereby generating a decrypted bit. Other decryption algorithms are generally known and may also be used in the context of the present invention. The decryption may be performed using at least one decryption device, not shown here, configured for decrypting the encrypted data by using the encryption key. The decryption device may be configured for performing the step of decrypting the data. The decryption device specifically may comprise at least one processor configured for performing the decrypting, as outlined above. The decryption device may fully or partially be embodied in software running on at least one computer.

The method may comprise a printing step, wherein at least one block 150, i.e. one digital RGB image is printed. FIG. 4 shows an example of a printed blockchain 146.

FIG. 5 shows an exemplary embodiment of a crypto currency unit 158. Crypto currency may be configured for working as a medium of exchange wherein individual coin ownership records are stored in a blockchain, in particular in a blockchain 146 according to the present invention. The blockchain 146 may allow controlling transfer and ownership of crypto currency units. A crypto currency unit 158 may be a unit of arbitrary size. As shown in FIG. 6, each transaction of the crypto currency unit is done by performing the following steps:

Generating a digital RGB image, e.g. the first digital RGB image 112, having RGB colors by scanning a physical object 114;

Combining first transaction data 116 and the digital RGB image, thereby generating an intermediate RGB image 160;

Combining identity information 162 and the intermediate RGB image 160, thereby generating an authentication image 164 having further RGB colors;

Converting color values of the authentication image 164 from RGB color space 130 to a secondary color space 132 having at least four primary colors and determining a number of respectively colored pixels for each primary color of the secondary color space 132;

Generating a one-time verification number 166 by converting the determined number of respectively colored pixels for each primary color of the secondary color space to hexadecimal numerals.

With respect to generating of a digital RGB image reference is made to the description of generating the first RGB image as described in detail with respect to FIG. 1A.

The combining of the first transaction data 116 and the digital RGB image may comprise determining a binary code of the digital RGB image. The determining of the binary code of the digital RGB image may comprise converting color values of each pixel of the digital RGB image into hexadecimal numerals. For example, the conversion of the color values into hexadecimal numerals may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The determined hexadecimal numerals may be further converted into the binary code of the digital RGB image, for example, by using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/. The added binary codes of the digital RGB image and of the first transaction data 116 may be converted into hexadecimal numbers which may be converted into color values. For example, the conversion of hexadecimal numerals into the color values may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The intermediate RGB image 160 may be generated by using the determined color values for the corresponding image pixels. The intermediate RGB image 160 may be a digital image, in particular a digital RGB image, comprising the transaction data 116.

The identity information 162 may be arbitrary information providing unique identification of a value owner, such as a picture of the owner. The authentication image 164 may be a digital RGB image, comprising the identity information 162.

The combining of the identity information 162 and the intermediate RGB image 160 may comprise determining a binary code of the intermediate RGB image 160. The determining of the binary code of the intermediate RGB image 160 may comprise converting color values of each pixel of the intermediate RGB image 160 into hexadecimal numerals. For example, the conversion of the color values into hexadecimal numerals may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The determined hexadecimal numerals may be further converted into the binary code of the intermediate RGB image 160, for example, by using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/. The added binary codes of the intermediate RGB image 160 and of identity information 162 may be converted into hexadecimal numbers, by using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/. The hexadecimal numbers may be converted into color values. For example, the conversion of hexadecimal numerals into the color values may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The authentication image may be generated by using the determined color values for the corresponding image pixels.

The authentication image 164 may be digitally converted from RGB colors to a secondary color space 132. Preferably, the secondary color space 132 is the CMYK color space, wherein the primary colors of the secondary color space are black, cyan, magenta, yellow and white, whereby white is meant as no color on a white substrate. The conversion from the RGB color space 130 to the secondary color space 132 may be performed for each pixel of the authentication image 164. The conversion from the RGB color space 130 to the secondary color space 132 may be performed using at least one mathematical algorithm and/or at least one pre-determined relationship such as a look-up table, e.g. as described for the conversion of the RGB color space into CMYK color space in U.S. Pat. No. 5,283,671A, or in "Schule der Farben—Grundzüge der Farbentheorie für Computeranwender and andere", Küppers, Harald, DuMont Buchverlag, Köln 2. Edition, ISBN 978-3-7701-2841-9, pages 125-134 or www.farbtabelle.at/farben-umrechnen. The conversion from the RGB color space 130 may be performed using at least one software, in particular a software of the printer for converting the RGB colors.

The converted image may be further transformed into a pattern 138. The pattern may be a grid. The pattern may comprise at least one matrix comprising rows and columns indicating the presence or absence of primary colors of the respective pixel. The further transformation, in particular rastering, may be performed by the printer software. Next, the colored dots may be counted. The determining of the number of respectively colored pixels for each primary color of the secondary color space may comprise counting colored dots of the converted and rastered image, in particular of the matrices.

The determined number of pixels of each primary color may be converted to hexadecimal numerals. Specifically, the color dot numbers are transferred to hexadecimal numerals. The conversion of the determined number into hexadecimal numerals into the color values may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5.

The generating of the one-time verification number may comprises converting the determined number of respectively colored pixels for each primary color of the secondary color space via a pre-defined formula to fixed-size hexadecimal values. Specifically, the determined number of pixels of each primary color may be converted to a fixed-size value without decimal digits. The pre-defined formula may be a logarithmic formula. The information of the counted dots may be transferred into hexadecimal numerals via a logarithmic formula to fixed-size values—which is necessary for hashing any transaction. The pre-defined mathematical formula for converting the determined number of respectively colored pixels for each primary color of the secondary color space to fixed-size hexadecimal values may be "a+b*x+c*(x/16)+d*1000\*ln(x+1), wherein "x" is the number of pixels of each primary color and a, b, c and d are parameters. For example, for generating 4-digit hexadecimal numerals, the value of "a" may be 4,096 for all of the following cases: In case of the sum of all pixels of each primary color is smaller than 60,000, "b" is 1, "c" and "d" are 0; in case of the sum of all pixels of each primary color is between 60,000 and 950,000, "c" is 1, "b" and "d" are 0. In case of the sum of all pixels of each primary color is larger than 950,000, "d" is 1, "b" and "c" are 0. Thereby, the result from the calculation by the predefined formula may be rounded down to full hexadecimal numerals." For example, for generating hash values of other fixed-size than 4-digit hexadecimal numerals, e.g. 3-digit or 10-digit, "a", "b", "c" and "d" may be adjusted accordingly.

The one-time verification number 166 may be a number which can be used for verification of the crypto currency unit, in particular to prevent counterfeiting. The generating of the unit 158 of the crypto currency may comprise printing the crypto currency unit. The printed crypto currency unit 158 may comprise a printout of the authentication image 164 and a verification number 168. By scanning and decoding the authentication image the one-time verification number 166 can be extracted. The extracted one-time verification number 166 can be compared to the verification number 168 on the printout. If they match the crypto currency unit 158 is verified. Forgery thus is impossible due to link of the image with the one-time verification number 166, which is saved in the blockchain 146.

LIST OF REFERENCE NUMBERS

110 hash value
112 first digital RGB image
114 physical object
116 first transaction data
118 second RGB image
120 digital scanning
122 mixing
124 blending device
126 digital image element
128 Converting
130 RGB color space
132 secondary color space
134 determining
136 Generating
138 pattern
139 second transaction data
140 third RGB image
142 further hash value
144 Generating
146 blockchain
148 digital RGB image
150 block
152 genesis block
154 subsequent block
156 further block
158 crypto currency unit
160 intermediate RGB image
162 identity information
164 authentication image
166 one-time verification number
168 verification number

The invention claimed is:

1. A computer implemented method for generating a hash value, the method comprising the following steps:
   i) providing a first digital RGB image having first RGB colors of a physical object;
   ii) combining first transaction data and the first digital RGB image, thereby generating a second RGB image having second RGB colors;
   iii) converting color values of the second RGB image from RGB color space to a secondary color space having at least four primary colors and determining a number of respectively colored pixels for each primary color of the secondary color space;
   iv) generating the hash value by converting the determined number of respectively colored pixels for each primary color of the secondary color space to hexadecimal numerals.

2. The method according to claim 1, wherein providing of the first digital RGB image comprises blending and/or mixing pigments and scanning the blended and/or mixed pigments.

3. The method according to claim 1, wherein the pigment is selected from natural organic materials and from synthetic organic materials.

4. The method according to claim 1, wherein the pigment is selected from inorganic materials, preferably from metal oxides, more preferably from iron oxides.

5. The method according to claim 1, wherein the secondary color space is the CMYK color space, wherein the primary colors of the secondary color space are black, cyan, magenta, yellow and white.

6. The method according to claim 1, wherein step i) comprises generating a digital image element by sizing the first digital RGB image to a pre-defined size, wherein the size of digital image element is larger than a size of the first transaction data.

7. The method according to claim 1, wherein step ii) comprises determining a binary code of the first digital RGB image and adding a binary code of the first transaction data to the binary code of the first digital RGB image thereby generating the second digital RGB image having second RGB colors.

8. The method according to claim 1, wherein step ii) comprises mapping the first transaction data to the first digital RGB image.

9. The method according to claim 1, wherein generating of the hash value comprises converting the determined number of respectively colored pixels for each primary color of the secondary color space via a pre-defined formula to fixed-size hexadecimal values.

10. The method according to claim 1, wherein the method comprises printing of the transaction data on a substrate, by printing the second RGB image on the substrate and by printing the hexadecimal numeral of the hash value on the same substrate, wherein the method comprises verification of the printed transaction data, by verifying the second digital RGB image.

11. Computer implemented method for generating a root-hash, wherein the method comprises determining a first hash value by using the method for generating a hash value according to claim 1, wherein the generating of the root-hash comprises the following steps:
   a) combining second transaction data (139) and the first digital RGB image, thereby generating a third RGB image having third RGB colors;
   b) converting color values of the third RGB image from RGB color space to the secondary color space and determining a number of respectively colored pixels for each primary color of the secondary color space;
   c) generating a further hash value by converting the determined number of respectively colored pixels for each primary color of the secondary color space to hexadecimal numerals;
   d) generating the root hash by aggregation of the first hash value and the further hash value.

12. The method according to claim 11, wherein the method comprises generating further hash values for further transaction data and generating the root hash by aggregation of the hash values.

13. A blockchain based on digital images, wherein the blockchain comprises a plurality of linked blocks, wherein the blockchain is generated by using a method for generating a blockchain according to claim 1 relating to a method for generating a blockchain.

* * * * *